(12) United States Patent
Sakamoto et al.

(10) Patent No.: US 6,490,064 B1
(45) Date of Patent: Dec. 3, 2002

(54) WAVELENGTH DIVISION MULTIPLEXING OPTICAL TRANSMISSION SYSTEM

(75) Inventors: Tadashi Sakamoto, Tokyo (JP); Shigeki Aisawa, Tokyo (JP); Masahiko Jinno, Tokyo (JP); Seiji Norimatsu, Tokyo (JP); Jun-ichi Kani, Tokyo (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 09/171,193
(22) PCT Filed: Feb. 16, 1998
(86) PCT No.: PCT/JP98/00612
§ 371 (c)(1),
(2), (4) Date: Mar. 17, 1999
(87) PCT Pub. No.: WO98/36514
PCT Pub. Date: Aug. 20, 1998

(30) Foreign Application Priority Data

Feb. 14, 1997 (JP) ............................................. 9-030618
Apr. 28, 1997 (JP) ............................................. 9-111062

(51) Int. Cl.⁷ ............................................. H04J 14/02
(52) U.S. Cl. ............................................. 359/124
(58) Field of Search ............................ 359/124, 125, 359/161, 173

(56) References Cited

U.S. PATENT DOCUMENTS

| | | | |
|---|---|---|---|
| 5,063,559 A | 11/1991 | Marcuse | 359/127 |
| 5,361,319 A | * 11/1994 | Antos et al. | 385/123 |
| 5,602,666 A | 2/1997 | Ishikawa et al. | 359/161 |
| 5,612,807 A | * 3/1997 | Ishikawa et al. | 359/161 |
| 5,636,046 A | 6/1997 | Ishikawa et al. | 359/161 |
| 5,852,701 A | * 12/1998 | Kato et al. | 385/127 |
| 5,854,871 A | * 12/1998 | Akasaka | 385/123 |
| 6,055,081 A | * 4/2000 | Koyano et al. | 359/161 |
| 6,104,514 A | * 8/2000 | Fee et al. | 359/161 |
| 6,157,477 A | * 12/2000 | Robinson | 359/161 |
| 6,239,902 B1 | * 5/2001 | Islam et al. | 359/334 |

OTHER PUBLICATIONS

Forghieri et al., "Reduction of Four–Wave Mixing Crosstalk in WDM Systems Using Unequally Spaced Channels," IEEE Photonics Technology Letters, vol. 6, No. 6, Jun. 1994, pp. 754–756.

Fukui et al., "Influence of Fiber Nonlinear Effects on WDM Transmission Systems with Dispersion Management," Proceeding of the 1996 IEICE General Conference, B–1138, Mar. 28–31, 1996 (w/ English Abstract).

Griles et al., "Bidirectional Transmission to Reduce Fiber FWM Penalty in WDM Lightware Systems," Optical Amplifiers and Their Applications, Jun. 1995, pp. 76–79.

Inoue et al., "Fiber Four–Wave Mixing in Multi–Amplifier Systems with Nonuniform Chromatic Dispersion," Journal of Lightwave Technology, vol. 13, No. 1, Jan. 1995.

Jinno et al., "First Demonstration of 1580 nm Wavelength Band WDM Transmission for Doubling Usable Bandwidth and Suppressing FWM in DSF," Electronics Letters, vol. 33, No. 10, May 8, 1997, pp. 882–883.

Jinno et al., "1580 nm Band, Equally–Spaced 8×10 Gb/s WDM Channel Transmission over 360 km (3×120 km) of Dispersion–Shifted Fiber Avoiding FWM Impairment," Optical Amplifiers and Their Applications, MC2–4/39, Jul. 21–23, 1997.

Mahlein, "Crosstalk Due to Stimulated Raman Scattering in Single–Moded Fibres for Optical Communication in Wavelength Division Multiplex Systems," Optical and Quantum Electronics, 1984, pp. 409–425.

* cited by examiner

Primary Examiner—Leslie Pascal
Assistant Examiner—Dalzid Singh
(74) Attorney, Agent, or Firm—Pennie & Edmonds LLP

(57) ABSTRACT

In a wavelength division multiplexed optical transmission system wherein the zero dispersion wavelength of the optical fiber transmission path 224 is in the 1550 nm region, among multiplexed optical signals, the wavelengths of either of at least two optical signals are allocated between 1450 nm and 1530 nm, or between 1570 mn and 1650 nm.

11 Claims, 20 Drawing Sheets

STRUCTURE OF THE FIRST EMBODIMENT
OF THE PRESENT INVENTION

GAIN CHARACTERISTICS OF A Tm-DOPED OPTICAL FIBER AMPLIFIER (TDFA)

GAIN CHARACTERISTICS OF A Er-DOPED OPTICAL FIBER AMPLIFIER (GS-EDFA)

STRUCTURE OF THE FORTH EMBODIMENT OF THE PRESENT INVENTION

STRUCTURE OF THE FIFTH EMBODIMENT
OF THE PRESENT INVENTION

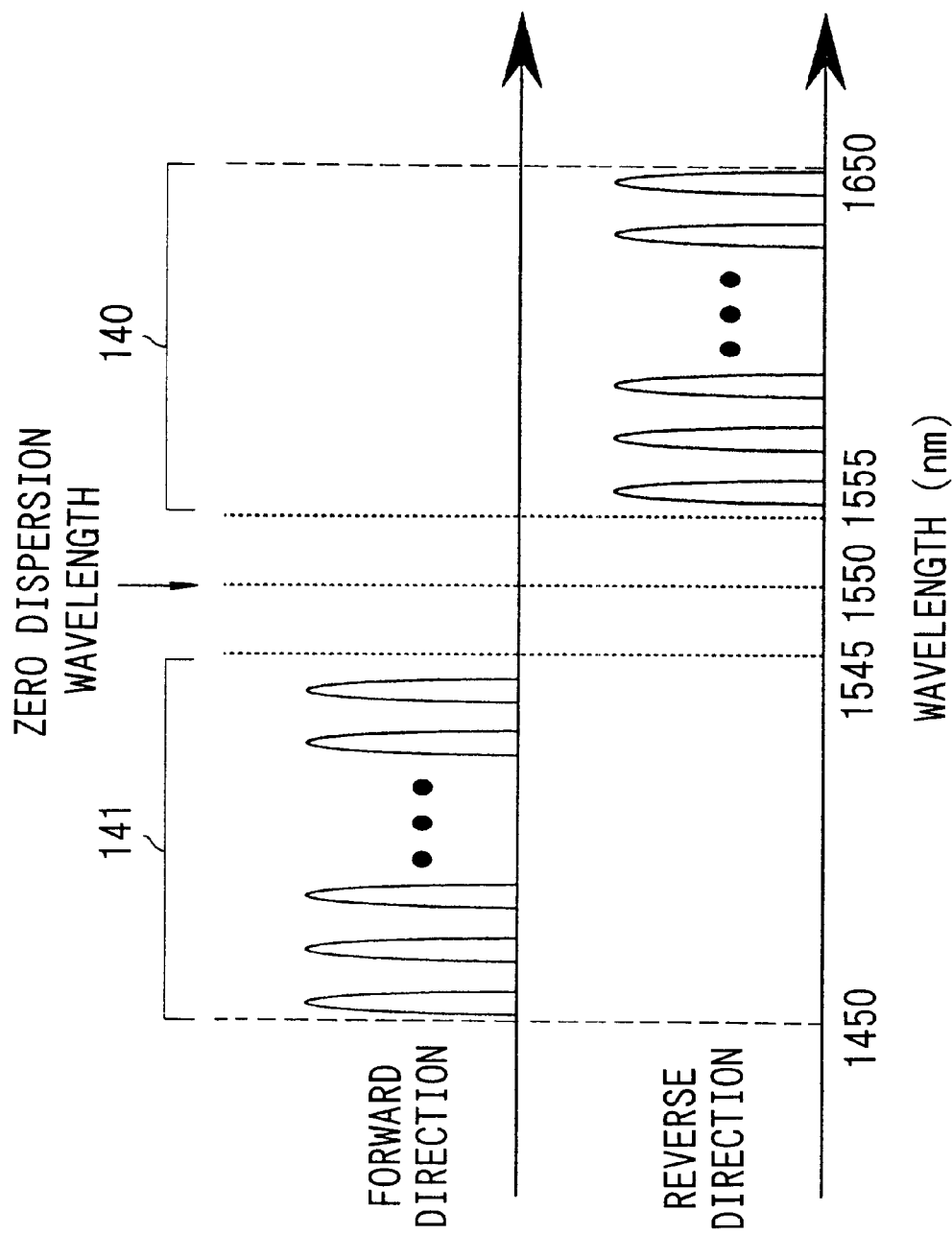

WAVELENGTH DIVISION MULTIPLEXING OPTICAL TRANSMISSION SYSTEM

FIELD OF THE INVENTION

The present invention relates to a wavelength division multiplexed optical transmission system which transmits a wavelength division multiplexed optical signal using a dispersion-shifted fiber.

DESCRIPTION OF RELATED ART

Wavelength Division Multiplexing (WDM) transmission technology is a technology in which optical signals of differing wavelength (optical frequency) are multiplexed, and transmitted via one optical fiber transmission path. Here, the optical signal is the optical output of a light source directly modulated by a data signal (direct modulation type), or an optical transmission wave output from a light source modulated by a data signal using an external modulator (external modulation type), and this wavelength is determined by the light source wavelength.

By disposing along the optical fiber propagation path optical amplifiers which amplify the optical signal as-is, and compensating the transmission loss of the optical fiber transmission path, it is possible to extend the span between regenerative repeaters which are necessary for discriminative reproduction processing at the electrical step. This optical amplifier can increase the transmission capacity of an installed optical fiber transmission path by many times the number of wavelengths simply by altering the transmission and receiving apparatuses for wavelength division multiplexing use because it possesses a function in which optical signals of differing wavelength are amplified together. For example, the amplification wavelength bandwidth of an erbium doped optical fiber amplifier (EDFA) is between 1.53 $\mu$m and 1.56 $\mu$m, and by multiplexing optical signals at wavelength intervals of 0.8 nm in this wavelength band, about 30 channels of optical signals can be transmitted through in one optical fiber.

However, installed dispersion-shifted fibers transmit optical signals of a designed zero-dispersion wavelength. When transmitting wavelength division multiplexed optical signals in this dispersion-shifted fiber, cross-talk due to four-wave mixing, a non-linear optical effect, is generated, and because of this the input power to the transmission path fiber could not be increased. In the following this problem will be explained in detail.

The propagation loss of a silica optical fiber is minimal in the 1.5 $\mu$m to 1.6 $\mu$m region. A dispersion-shifted fiber is designed so that the wavelength dispersion is zero in the 1.55 $\mu$m wavelength region, and by suppressing waveform degradation due to wavelength dispersion at this wavelength, the transmission distance can be increased. In addition, while the International Standards Organization has stipulated that the zero dispersion wavelength of a dispersion-shifted fiber is allocated between 1.525 $\mu$m and 1.575 $\mu$m, practically the distribution is roughly between 1.535 $\mu$m and 1.565 $\mu$m, centered on 1.550 $\mu$m, and up to the present, these have been widely installed.

In contrast, when optical signals of differing optical frequencies are input into an optical fiber, new optical frequencies dependent on the difference in input optical frequencies are generated based on third-order non-linearity within the optical fiber. This is called "four-wave mixing," and is a phenomenon wherein, for example, an optical frequency $f_1+f_2-f_3$ is generated from input optical frequencies $f_1$, $f_2$, and $f_3$. This four-wave mixing is more easily generated the smaller the dispersion value of the input optical wavelength, or the larger the input power of each individual wavelength.

If the optical frequency intervals between the wavelength division multiplexed optical signals input into this kind of optical fiber are uniform, the optical frequency newly produced by four-wave mixing will conform with one optical wavelength among those of the optical signal, and strong noise will be generated by mutual interference. In addition, even when the optical frequency intervals of the wavelength division multiplexed optical signal are not uniform, the optical power of the original optical signal is consumed in the generation of four-wave mixing, and this produces strong noise; When the optical frequency interval of the wavelength division multiplexed optical signal has even spacing, excess noise originating in four-wave mixing is generated by an input power per wavelength from about −5 dBm, and when the spacing is uneven, it is generated by an input power per wavelength from about −2 dBm. Because of this, the optical power that can be input into the optical fiber transmission path cannot exceed this value, and as a result, the transmission distance is limited.

The object of the present invention is to provide a wavelength division multiplexed optical transmission system which can use dispersion-shifted fibers installed in an optical transmission path and transmitting wavelength division multiplexed optical signals, and can increase the permissible optical input power to a dispersion-shifted fiber.

The present invention is a wavelength division multiplexed optical transmission system or a wavelength division multiplexed optical transmission method wherein among wavelength division multiplexed optical signals the wavelengths of either of at least two optical signals are between 1450 nm and 1530 nm, or between 1570 nm and 1650 nm when a dispersion-shifted fiber whose zero dispersion wavelength is in the 1550 nm region is used as a transmission path.

In this manner, by limiting the used wavelength bandwidth, the influence of four-wave mixing in the dispersion-shifted fiber can be avoided. Thus, it is possible to enlarge the permissible input power to the dispersion-shifted fiber.

BRIEF DESCRIPTION OF THE DRAWINGS

FIG. 21 explains the wavelength band limit of the optical signal when the zero dispersion wavelength of the dispersion-shifted fiber is 1550 nm.

PREFERRED EMBODIMENTS OF THE INVENTION

Figure 1:
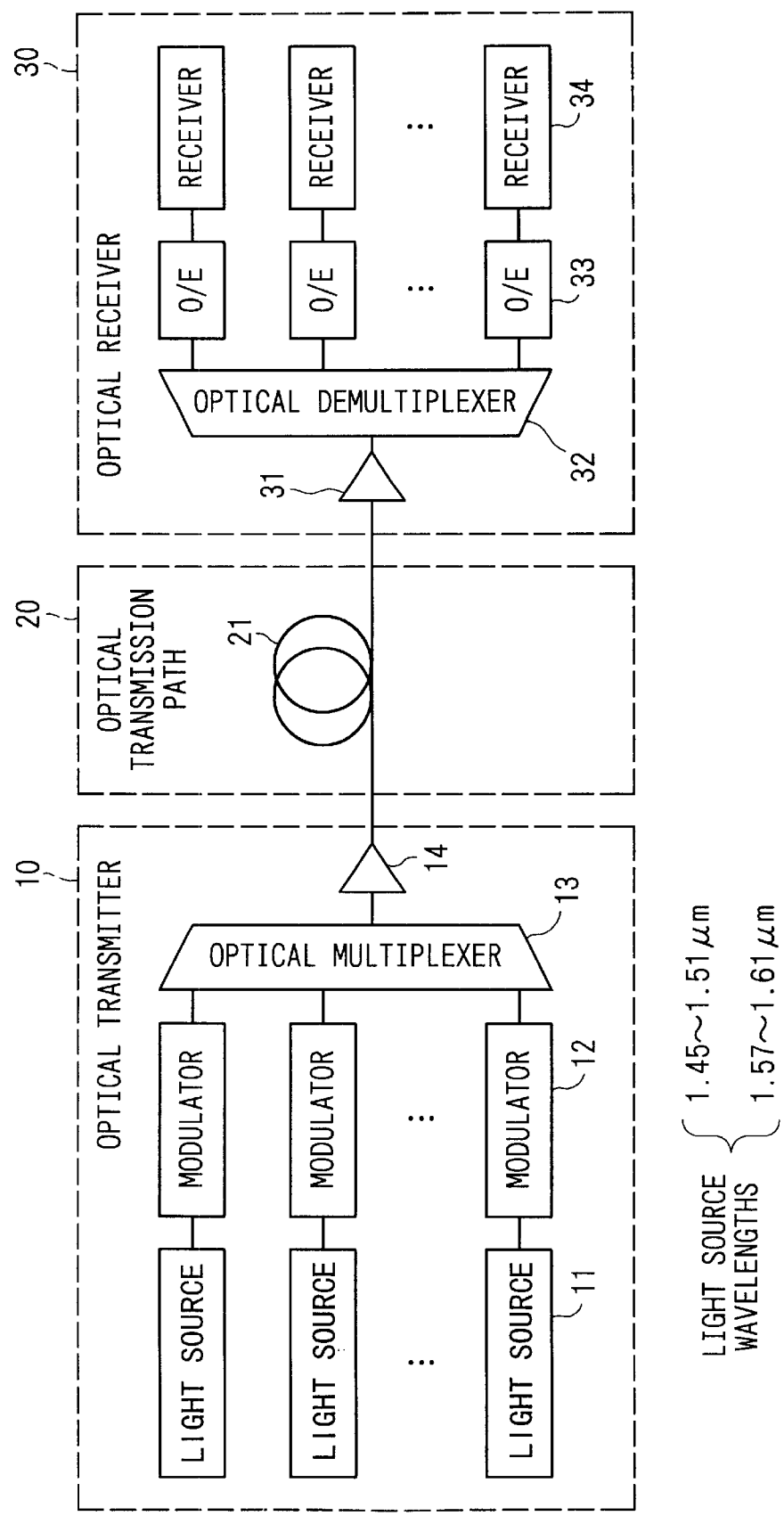
FIG. 1 is a block diagram showing the structure of the first embodiment in the first wavelength band limit.

First, a wavelength division multiplexed optical transmission system wherein the wavelength of wavelength division multiplexed optical signals is allocated between 1450 nm and 1510 nm or between 1570 nm and 1610 nm, (this is called "the first wavelength band limit") will be explained for an optical transmission path a dispersion-shifted fiber designed so the zero dispersion wavelength is in the 1.55 $\mu$m region.

Following this, a wavelength division multiplexed optical transmission system wherein the wavelength of wavelength division multiplexed optical signals are allocated between 1450 nm and 1530 nm or between 1570 nm and 1650 nm (this is called "the second wavelength band limit") will be explained.

[Embodiment of the First Wavelength Band Limit]

Below, the reasons and system concept for setting the wavelengths of wavelength division multiplexed optical signals between 1450 and 1510 or between 1570 and 1610 will first be explained. Following this, five embodiments of the system will each be explained.

The wavelength division multiplexed optical transmission system of the present invention uses as an optical transmission path a dispersion-shifted fiber whose zero dispersion wavelength is set at 1.55 $\mu$m, and each wavelength of optical signals is set so that the absolute value of the wavelength dispersion when propagating along with dispersion-shifted fiber is 0.5 ps/nm/km or greater.

In a citation (Fukui, et al. "Influence of fiber nonlinear effects on WDM transmission system with dispersion management," 1996 General Conference of the Institute of Electronics, Information, and Communication Engineers, 13–1138) the possible transmission distance limit due to four-wave mixing was considerably extended if the absolute value of the dispersion is 0.5 ps/ns/km or above.

In contrast, the actual zero dispersion wavelength of a dispersion-shifted fiber wherein the zero dispersion wavelength is set in the 1.55 $\mu$m region can be considered to be distributed from about 1.535 $\mu$m~1.565 $\mu$m when production variations are taken into consideration, but the wavelength dispersion value in the 1.55 $\mu$m wavelength region is almost a linear function of the wavelength. In this case, if the dispersion slope is +0.07 ps/nm$^2$/km, a wavelength for which the absolute value of the wavelength dispersion is 0.5 ps/nm/km or greater will be 1.53 $\mu$m or less, or 1.57 $\mu$m or greater.

In addition, in the present embodiment, as a wavelength band of the wavelength division multiplexed optical signals, one of these two wavelength band or both wavelength bands are used. Specifically, a 1.57 $\mu$m to 1.61 $\mu$m wavelength bandwidth is used. Alternatively, a 1.45 $\mu$m to 1.51 $\mu$m wavelength bandwidth is used. Additionally, both wavelength bandwidths are used. Thus, due to a significant wavelength dispersion for each wavelength, the necessary phase matching conditions for generating four-wave mixing are not satisfied, and the generation of four-wave mixing can be suppressed. As a result, it is possible to increase the permissible optical input power of the dispersion-shifted fiber, and the possible transmission distance can be greatly extended.

Conventionally, in optical fiber communication using the low loss region of an optical fiber, the 1.55 $\mu$m band is used. The general reasons for this are that during the initial period of optical fiber development, it was reported that the low loss region was 1.55 $\mu$m, and in addition that the optical fiber amplifiers which brought about the remarkable advancement in the capabilities of the optical communication systems in recent years have an amplifier bandwidth at 1.55 $\mu$m. Therefore, in optical fiber communication, the use of bands outside of the 1.55 $\mu$m band has not been neglected.

Figure 8:
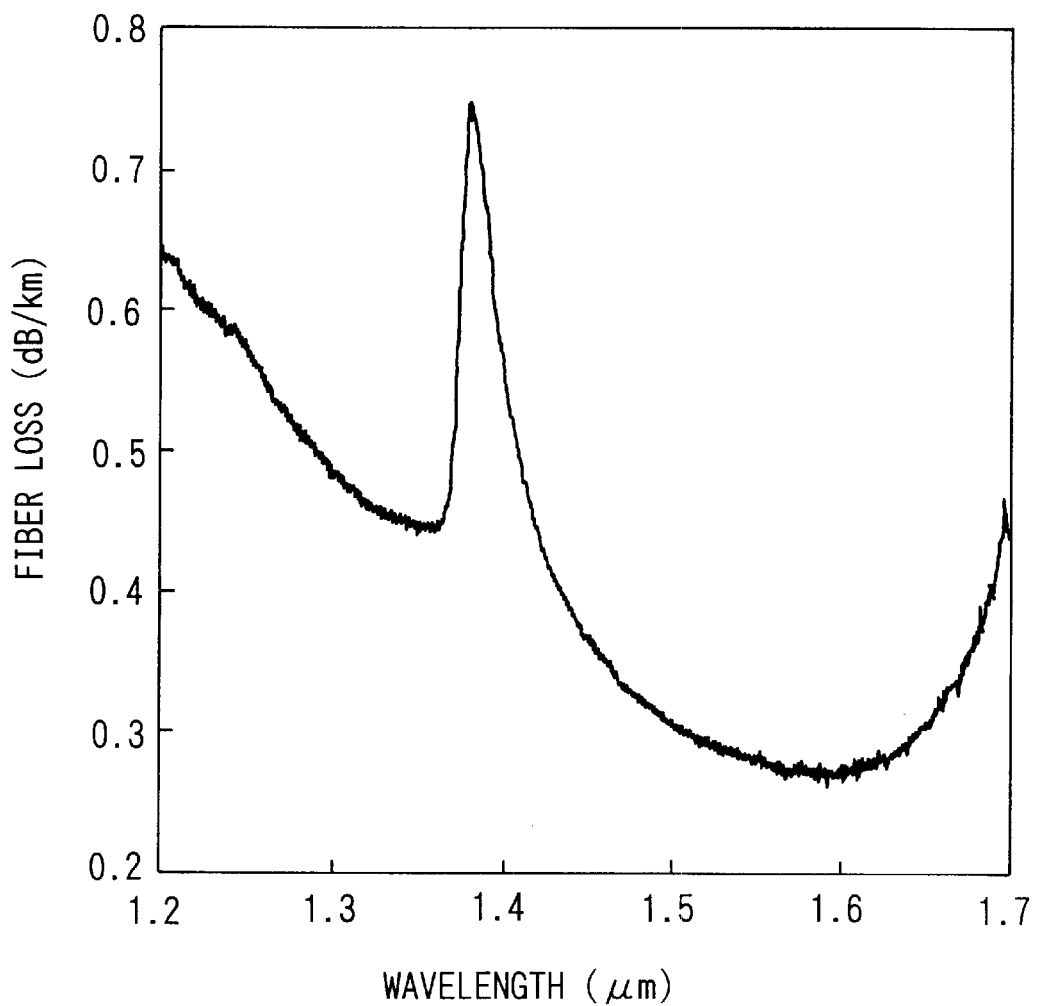
FIG. 8 shows the loss characteristics of an optical fiber installed at a cite for communication use.

However, installed optical fibers on-site used for commination have the loss characteristics shown in FIG. 8. That is, in the wavelength bandwidth of 1.57 $\mu$m –1.61 $\mu$m used in the present invention, it is apparent that there is an even lower loss above 1.55 $\mu$m. It is apparent from this that in addition to this effect, the effect can be obtained that it is possible to transmit at a lower loss by the use of wavelength bandwidth conventionally neglected.

Moreover, in a wavelength division multiplexed optical transmission system on which linear optical repeaters are disposed in the optical transmission path, either the optical signal in both wavelength bandwidth can be amplified together by one optical amplifier, or the optical signals of the various wavelength bandwidths can be separated and amplified by separate optical amplifiers.

Next, five embodiments of the wavelength division multiplexed optical transmission system wherein the wavelengths of multiplexed optical signals are allocated either between 1450 nm and 1510 nm, or between 1570 nm and 1610 nm.

(First Embodiment)

FIG. 1 shows the structure of the first embodiment of the present invention. The present embodiment shows an example of a nonrepeated point-to-point transmission system which connects opposite an optical transmitter and optical receiver without repeaters.

In the figure, the present system comprises an optical transmitter 10, an optical transmission path 20, and an optical receiver 30. Moreover, a system which directly modulates the bias, etc., of the light source can also be applied to the optical transmitter 10.

The optical transmitter 10 here uses an external modulating system, and comprises light sources 11 which set mutually differing wavelengths, modulators 12 which modulate the optical propagated wave output from the light source by a data signal, an optical multiplexer 13 which multiplexes optical signals output from each modulator 12, and an optical post-amplifier 14 which amplifies together the wavelength division multiplexed optical signal output from the optical multiplexer 13. Moreover, the optical post-amplifier 14 is provided as necessary.

The optical transmission path comprises a dispersion-shifted fiber 21 whose zero dispersion wavelength is set at 1.55 $\mu$m.

The optical receiver 30 comprises an optical pre-amplifier 31 which amplifies together the wavelength division multiplexed optical signals propagated through the dispersion-shifted fiber 21, an optical demultiplexer 32 which demultiplexes the multiplexed optical signal to recover the optical signal of each wavelength, opto-electric converters (O/E) 33 which convert the optical signals of each wavelength to electrical signals, and electrical reception circuits 34 which recovers the data signal from each electrical signal. Moreover, if the optical pre-amplifier is disposed before the opto-electrical converter 33, it is possible to increase the receiver sensitivity. This optical pre-amplifier and the optical pre-amplifier 32 in front of the optical demultiplexer 31 are installed as necessary.

The wavelength of the light source 11 is set so that the absolute value of the wavelength dispersion when propagating along the dispersion-shifted fiber 21 is 0.5 ps/nm/km or greater. However, the zero dispersion wavelength of the dispersion-shifted fiber 21 is thought to be distributed approximately between 1.535 $\mu$m and 1.565 $\mu$m due to variance during manufacture, but if the dispersion slope is +0.07 ps/nm$^2$/km, a wavelength whose absolute value of the wavelength dispersion is 0.5 ps/nm/km or above becomes 1.53 $\mu$m or less, or 1.57 $\mu$m or greater. Therefore, the used wavelength band is a wavelength band of 1.53 $\mu$m or below (for example, 1.45 $\mu$m~1.51 $\mu$m), or the wavelength band of 1.57 $\mu$m or greater (for example, 1.571 $\mu$m~1.61 $\mu$m), or both of the wavelength bands.

(Second Embodiment)

Figure 2:
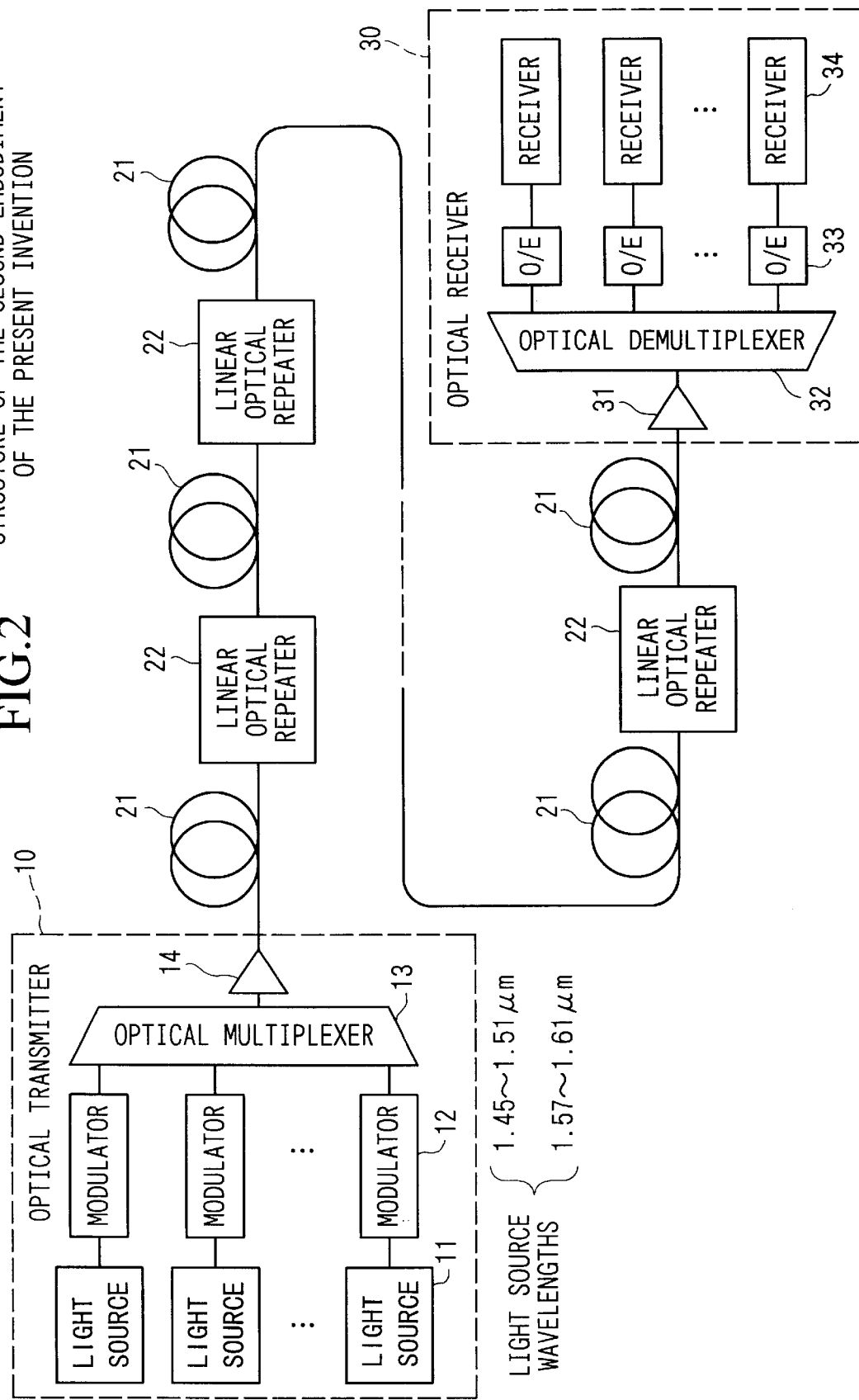
FIG. 2 is a block diagram showing the construction of the second embodiment in the first wavelength band limit.

FIG. 2 shows the structure of a second embodiment of the present invention.

The characteristic of the present embodiment is found in disposing linear optical repeaters 22 along the optical transmission path which is a major structural component of an optical amplifier in order to compensate the propagation loss of the dispersion-shifted fiber 21 in the first embodiment. That is, this is an example of a multi-repeater point to point propagation system. In this manner, the propagation distance can be dramatically extended. The characteristics of the dispersion-shifted fiber 21 and the used wavelength band are the same as those of the first embodiment. The propagation distance like that in the present embodiment is long, and when the optical power is maintained at a high level by linear optical repeaters 22, in the conventional construction the degradation of the transmission quality due to four-wave mixing is severe, but in the structure which limits the used wavelength band as in the present invention, the influence is small, and the effect remarkable.

In the first and second embodiments, as an optical amplifier, an optical fiber amplifier or a semi-conductor laser amplifier can be used, but an appropriate structure should be chosen depending on the various wavebands used.

Figure 3:
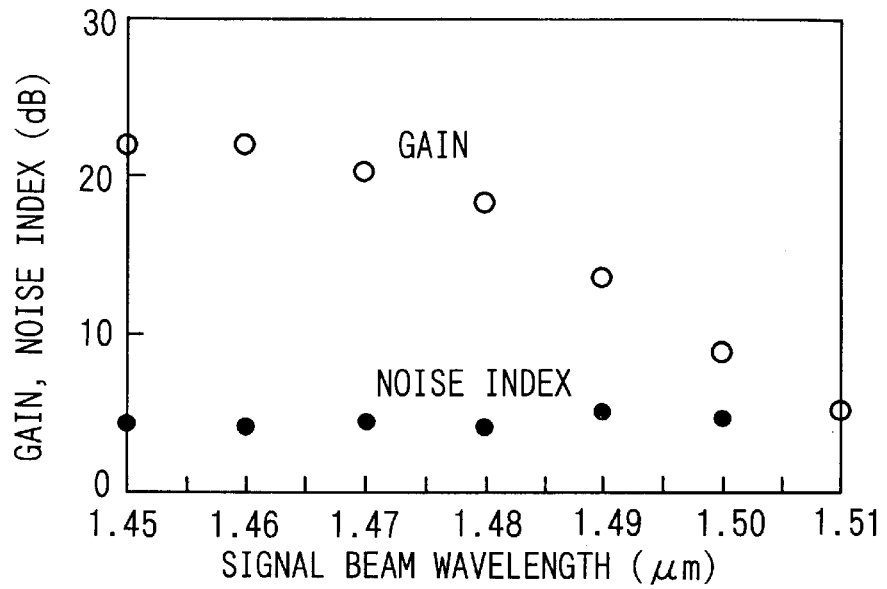
FIG. 3 shows the gain characteristics of a Tm-doped optical fiber amplifier (TDFA).

As an optical amplifier for the 1.45 $\mu$m~1.51 $\mu$m band, a Tm-doped optical fiber amplifier (TDFA) can be used. With respect to gain characteristics, as shown in FIG. 3, the high gain region is in the 1.45 $\mu$m~1.48 $\mu$m band. In exciting this TDFA, a light source in the 1.0 $\mu$m~1.2 $\mu$m band is used. As the excitation light source in this wavelength band, presently, an Nd: YAG laser and an Nd: YLF laser are available. In addition, by structuring the optical fibers for amplification in a cascade connection via an isolator or an optical band pass filter, an even higher gain amplifier can be obtained.

Figure 4:
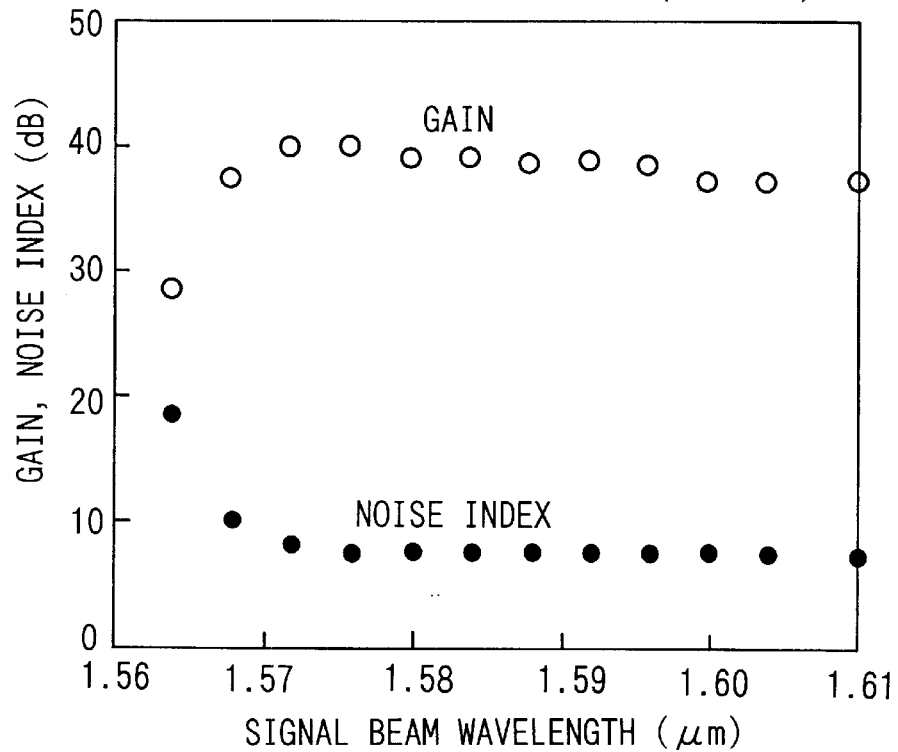
FIG. 4 shown the gain characteristics of an Er-doped optical fiber amplifier (GS-EDFA).

As an optical amplifier for the 1.57 $\mu$m~1.61 $\mu$m band, an Er-doped gain shifted optical fiber amplifier (GS-EDFA) is available. By optimizing the Er density, etc., of the optical fiber for amplification, it can shift the gain region (1.53 $\mu$m~1.56 $\mu$m) of the typical EDFA. Its gain characteristics are shown in FIG. 4. In the excitation of this GS-EDFA, a light source in the 0.98 $\mu$m or 1.48 $\mu$m neighborhood is used.

When the 1.53 $\mu$m or less wavelength band and the 1.57 $\mu$m or greater wavelength band are used simultaneously, by using a semiconductor laser amplifier with a wide gain bandwidth, it is possible to amplify the optical signals of both wavelength bands together. In addition, the development of optical fiber amplifiers which can amplify the optical signals in both wavelength bands together is progressing. Additionally, the respective optical signals of both wavelength bands can be multiplexed after being amplified separately. An example of this structure is explained in the third embodiment which follows.

(Third Embodiment)

Figure 5:
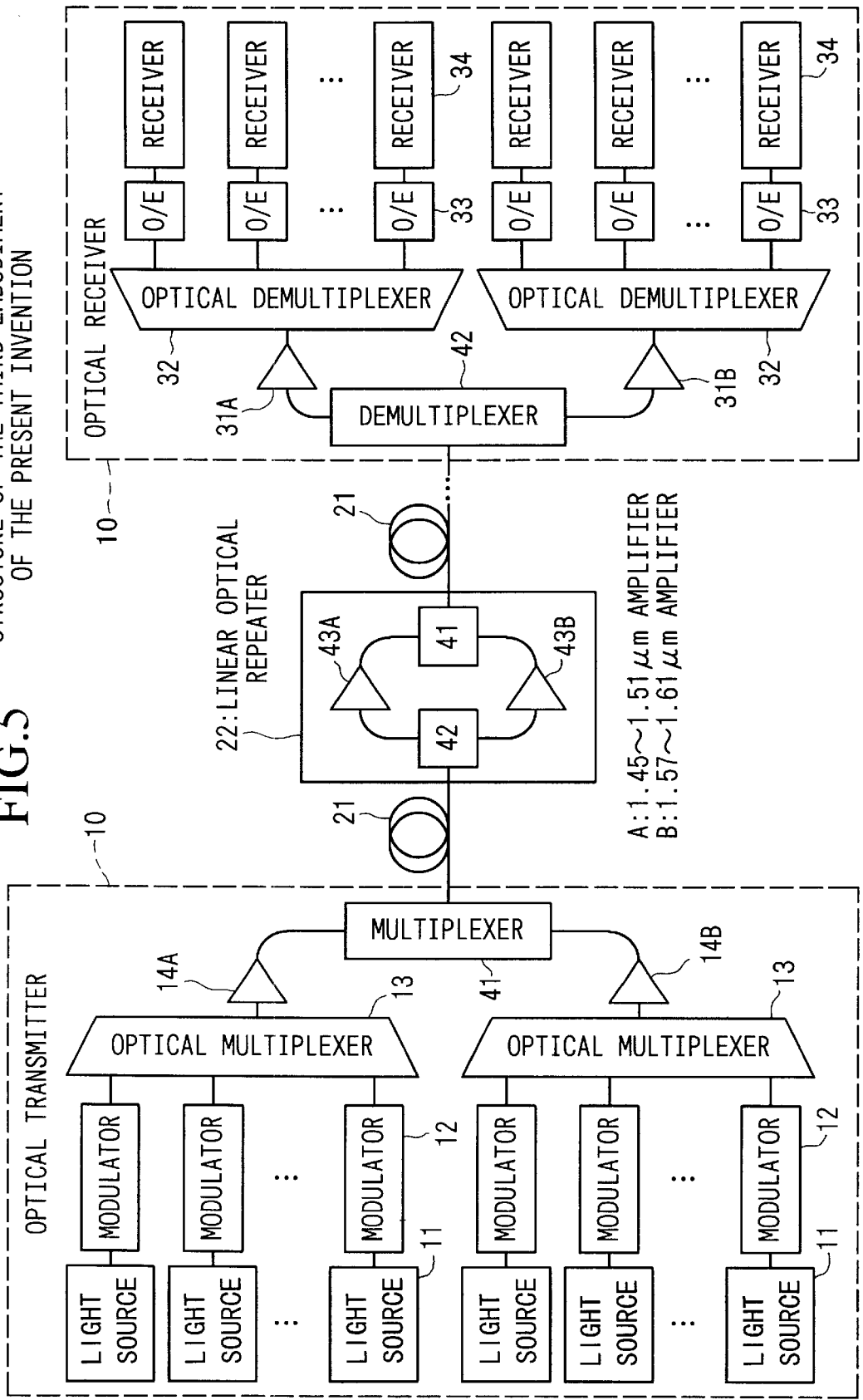
FIG. 5 shows a block diagram of the structure of the third embodiment in the first wavelength band limit.

FIG. 5 shows the structure of the third embodiment. This embodiment is an example of the multi-repeater point-to-point transmission system which is similar to that of the second embodiment shown in FIG. 2. Those functions which are the same as those in FIG. 2 have the same reference numbers.

In the optical transmitter 10, the optical signal in the 1.45 $\mu$m~1.51 $\mu$m band is amplified by an optical post-amplifier 14A using a TDFA, such as the one shown in FIG. 3, and the optical signal in the 1.57 $\mu$m~1.61 $\mu$m band is amplified by an optical post-amplifier 14B using a GS-EDFA, such as the one shown in FIG. 4. In addition, the optical signals of both bandwidths are multiplexed by a bandwidth multiplexer WDM filter 41, and transmitted to the dispersion-shifted fiber 21.

In the linear optical repeater 22, the optical signals of both bands are demultiplexed by a bandwidth demultiplexer WDM filter 42, the optical signal in the 1.45 $\mu$m~1.51 $\mu$m band is amplified by an optical amplifier 43A using a TDFA, such as that shown in FIG. 3, the optical signal in the 1.57 $\mu$m~1.61 $\mu$m band is amplified by an optical amplifier 43B using a GS-EDFA, such as that shown in FIG. 4, and then the optical signals in both wavelength bands are multiplexed again by a band multiplexer WDM filter 41.

In optical receiver 30, the optical signals of both bands are demultiplexed by a bandwidth demultiplexer WDM filter 42, the optical signals in the 1.45 $\mu$m~1.51 $\mu$m band are amplified by an optical amplifier 31A using a TDFA, such as that shown in FIG. 3, and the optical signal in the 1.57 $\mu$m~1.61 $\mu$m band is amplified by an optical amplifier 31B using a GS-EDFA, such as that shown in FIG. 4. Below, each optical signal is demodulated in the same manner as in the second embodiment.

The first, second, and third embodiments described above are examples of a point-to-point transmission system, and explained that degradation of the propagation quality due to four-wave mixing is avoid, and the transmission distance of the system using dispersion-shifted fibers can be dramatically increased. However, the present invention is not limited to a point-to-point transmission system, and can be applied to all wavelength division multiplexed optical transmission systems of a network. For example, it can be applied to a multi-repeater optical transmission on which signals which have been transformed into electrical signals after being demultiplexed in the optical receiver 30 in the second embodiment are digitally demodulated, and on which, if necessary, electrical signals are transformed into optical signals, wavelength division multiplexed, and transmitted to the optical transmission path after conducting routing processing electrically, or on which this procedure is repeated many times.

Finally, a wavelength division multiplexed optical transmission system on which an optical node that adds or drops one or specified optical signals along the optical transmission path can also be applied. Examples of this structure are explained below as the forth and fifth embodiments.
(Fourth Embodiment)

Figure 6:
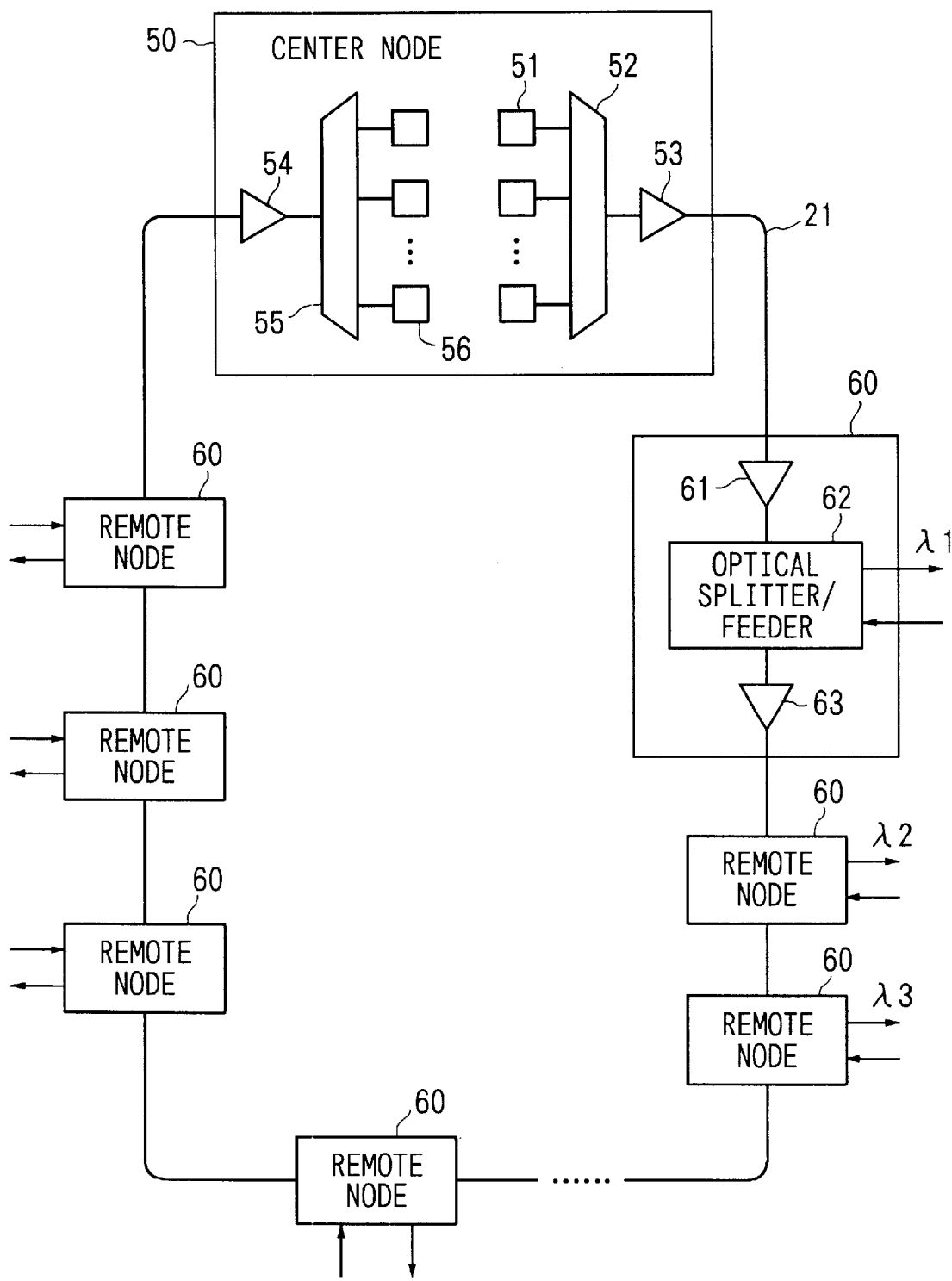
FIG. 6 is a block diagram of the structure of the forth embodiment in the first wavelength band limit.

FIG. 6 shows the structure of the fourth embodiment of the present invention.

In the figure, this system comprises a center node 50, remote nodes 60, and a dispersion-shifted fiber 21 which connects them in a ring.

Each remote node 60 carries out communication with the center node 50 by at least one or more differing wavelengths being allocated, and using each wavelength. A remote node 60 comprises an optical pre-amplifier 61 disposed as necessary, an optical adding and dropping circuit 62 which adds from the wavelength division multiplexed optical signals the optical signal with the allocated wavelength, and feeds the optical signal of this wavelength into the wavelength division multiplexing optical signals, and an optical post-amplifier 63 installed as necessary.

The center node 50 comprises a transmission system further comprising an optical transmitter 51 for each corresponding wavelength allocated to each remote node, an optical multiplexer 52 which multiplexes the optical signal of each wavelength, an optical post-amplifier 53 installed as necessary, and a receiving system comprising an optical pre-amplifier 54 installed as necessary, an optical demultiplexer 55 which demultiplexes the wavelength division multiplexed signals into the optical signals of each wavelength, and an optical receiver 56 for each corresponding wavelength.

The wavelength division multiplexed optical signals multiplexed by the center node 50 arrive at the remote nodes 60 by being propagated along the dispersion-shifted fiber 21. In the remote nodes 60, only the optical signals with the allocated wavelength are dropped off from the wavelength division multiplexed optical signals, and then the optical signals of this wavelength are added into the wavelength division multiplexed optical signals. The optical signals which have transited each remote node 60 arrive at the center node 50, and are dropped off here with each wavelength. In this manner, the structure of this embodiment is physically a ring network structure, but logically, it is a star network structure in which the center node 50 and remote nodes 60 are connected in a star formation by a bus which is distinguished by wavelength. Along the dispersion-shifted fiber 21, linear optical repeaters which compensate the transmission loss can be feed as necessary.
(Fifth Embodiment)

Figure 7:
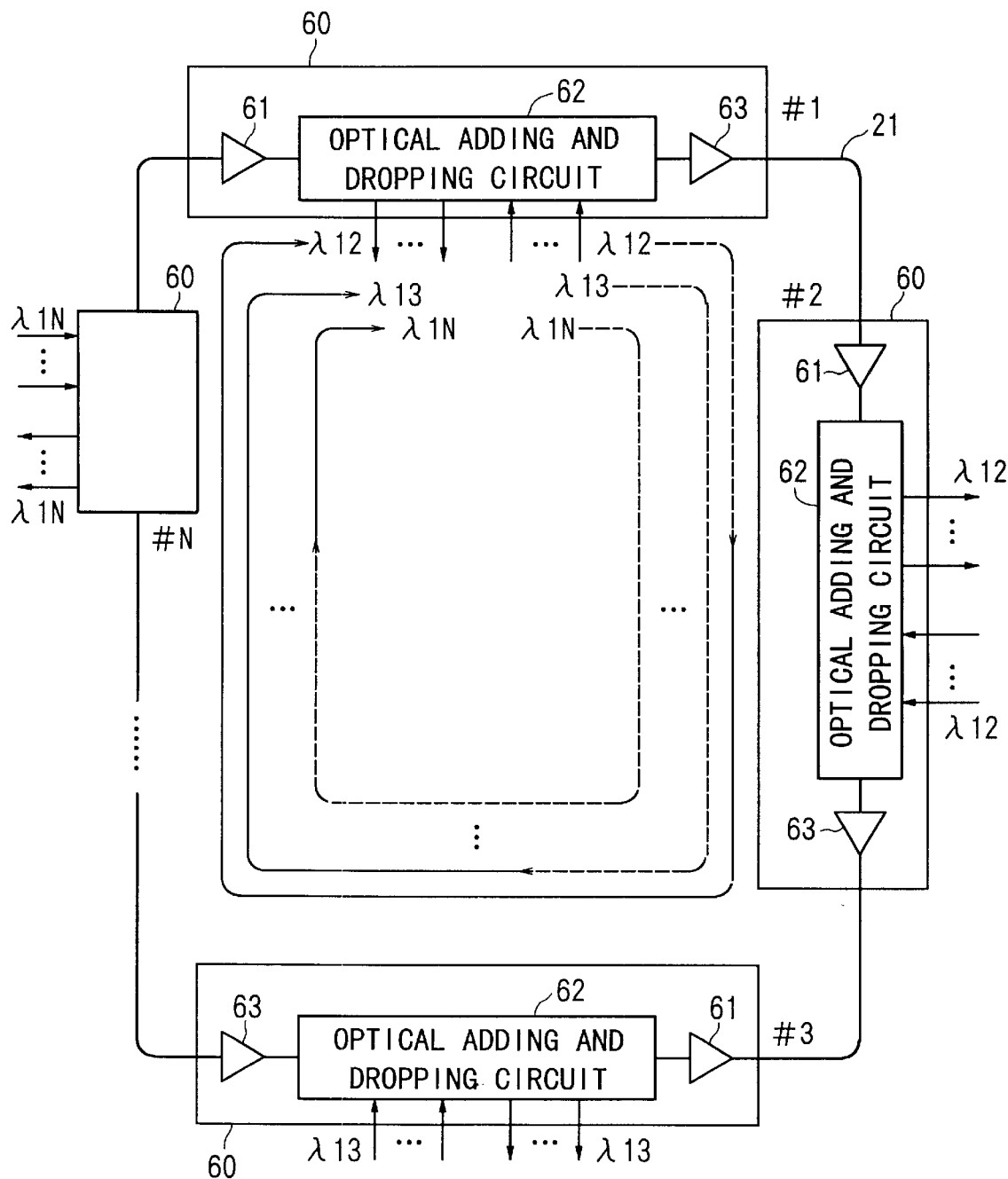
FIG. 7 is a block diagram of the structure of the fifth embodiment in the first wavelength band limit.

FIG. 7 shows the structure of the fifth embodiment of the present invention.

The characteristics of the present embodiment are that the center node, which gathers information, is eliminated from the structure of the fourth embodiment, paths which allocate dedicated wavelengths between each remote node are formed, and each remote node is connected by a mesh formation.

A remote node 60 comprises an optical pre-amplifier 61 which is installed as necessary, an optical adding and dropping circuit 62 which drops off the optical signals of an allocated wavelength from the wavelength division multiplexed optical signals, and adds the optical signals of this wavelength into the wavelength division multiplexed optical signals, and an optical post-amplifier 63 which is installed as necessary. In the communication between each remote node, various wavelengths are allocated, and if, for example, the total number of remote nodes is given as N, the remote node #1 carries out communication with remote nodes #2, #3, ..., #N by using the signals of wavelengths λ12, 13λ, ... : λ1N. In the case of propagation with one optical fiber, N (N−1)/2 wavelengths are necessary. If two optical fibers are used, it is possible to decrease the number of wavelengths by about (N−1)/8. Along the dispersion-shifted fiber 21, linear optical repeaters which compensate transmission loss can be feed as necessary.

If the present inversion is applied to the wavelength division multiplex link net which is formed with dispersion-shifted fibers as shown in the fourth embodiment or the fifth embodiment, it is possible to avoid the influence of four-wave mixing, expand the transmission distance between nodes, minimize channel separation, easily increase of the number of channels, and a significant effect can be expected. For example, the 1.45 μm~1.51 μm band, the 1.57 μm~1.61 μm band, or both bands can be used as the used wavelength bandwidth. The linear optical repeaters, when using both wavelength bands, can be similar to these in the third embodiment.

As explained above, the wavelength division multiplexed optical transmission system of the present invention can avoid the influence of four-wave mixing in a dispersion-shifted fiber by limiting the used wavelength bandwidth. In this manner, it is possible to increase the permissible input power of the dispersion-shifted fiber, and it is possible to extend greatly the potential transmission distance.

In addition, when using the 1.57 μm~1.61 μm bandwidth, because transmission loss can be even further decreased from the 1.55 μm band, it is possible to extend the possible transmission distance beyond that of the conventional 1.55 μm band. [Embodiment Related to the Restriction of the Second Wavelength Band]

Below, a wavelength division multiplexed transmission system wherein the wavelength of multiplexed optical signals are allocated either from 1450 nm to 1530 nm, or 1570 nm to 1650 nm will be explained.

First, the reason that the wavelength of the multiplexed optical signal is between 1450 nm and 1530 nm or between 1570 nm and 1650 nm will be explained.

To begin with, the relation between the wavelength dispersion of the optical signal, and the optical intensity of the four-wave mixing will be explained.

Here, as explained above, "four-wave mixing" is a phenomenon wherein a new frequency $f_{FWM}=f_i+f_j-f_k$ of the four-wave mixing are generated from non-linear interaction between three frequencies $f_1$, $f_2$, and $f_3$, and the propagation medium. Here, i, j, and k take any value from 1 to 3, and $j \neq k$. A four-wave mixing can occur when $f_i$ equals $f_j$, that is, even when two frequencies are launched. In wavelength division multiplex communication using a wavelength region with small dispersion, the generation efficiency of the four-wave mixing increases as the amount of phase matching $\Delta\beta$ becomes smaller. Here, the amount of phase mismatching is expressed by:

$$\Delta\beta=(-\lambda^4\pi/c^2)\cdot(dD/d\lambda)\cdot\{(f_i-f_0)+(f_j-f_0)\}\cdot(f_i-f_k)\cdot(f_j-f_k),$$

and is described in K. Inoue, "Fiber four-wave mixing in the zero-dispersion wavelength region," J. Lightwave Technology, Vol. 10, pp. 1553–1561, 1992.) Here, $f_0$ is the zero dispersion frequency of the fiber. In addition, λ is the wavelength, c is the speed of light, and D expresses the wavelength dispersion. From this equation, it can be understood that Δβ becomes zero when among the launched wavelength multiplexed signals, the optical frequency of one optical signal agrees with $f_0$ ($f_i=f_j=f_0$), or when $f_0$ lies between the optical frequencies of two optical signals ($f_i - f_0 = f_0 - f_j$), and the generation efficiency of four-wave mixing is at its highest. When the difference between the frequency of the generated four-wave mixing and any of the optical frequencies of the optical signals is within the receiving bandwidth of the receiver, the four-wave mixing waves become interference noise to the optical signals. When the frequencies of the optical signal disposed on an equally spaced optical frequency grid are allotted, that is, in the case of an equally spaced optical frequency allocation, the optical frequency of the generated four-wave mixing always come to be positioned on these grids. Because of this, in the case of an equally spaced optical frequency allocation, the influence of interference noise due to four-wave mixing is severe.

Figure 9:
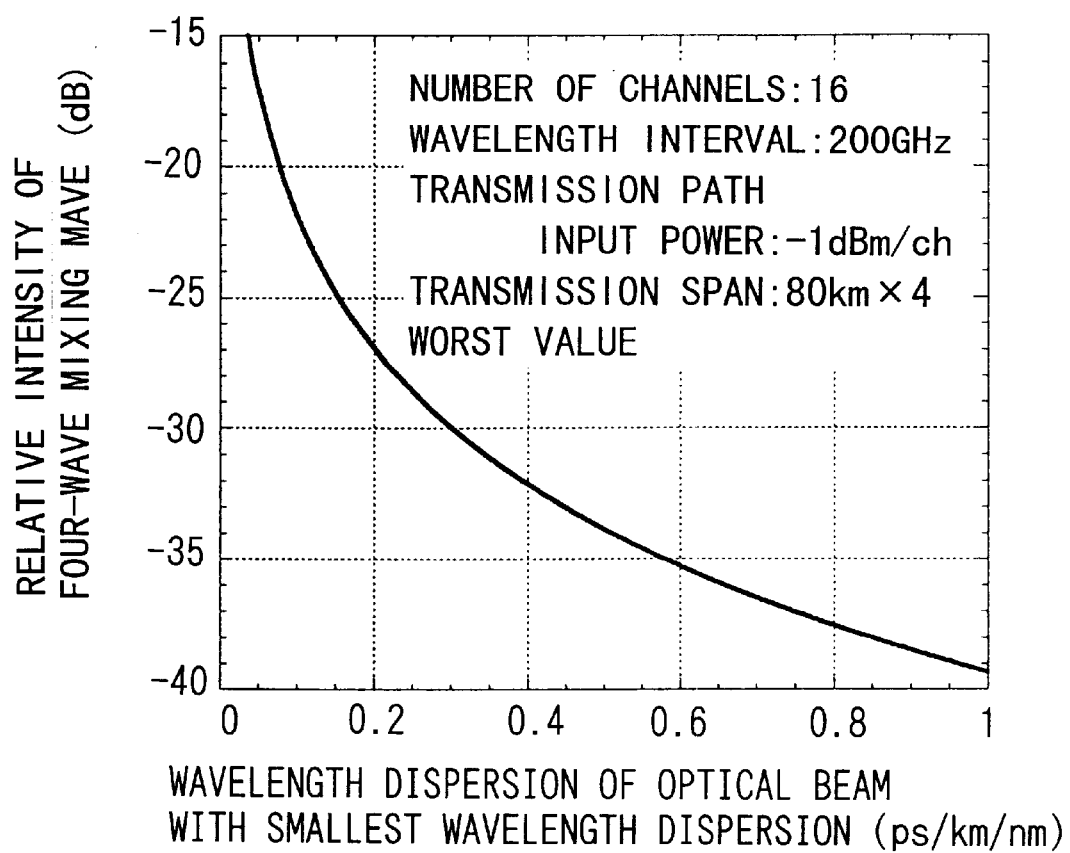
FIG. 9 shows the simulation results of the relation between wavelength dispersion of an optical signal and the intensity of four-wave mixing.

FIG. 9 is the result of simulation of the relation between the wavelength dispersion of a signal and the optical intensity of the four-wave mixing. The conditions of the simulation are as recorded in the upper right of FIG. 9. Moreover, the power of the four-wave mixing in this simulation was calculated according to the method presented in K. Inoue, H. Toba, "Fiber four-wave mixing in multi-repeater systems with nonuniform chromatic dispersion." J. Lightwave Technology, 13, pp. 88–93, 1995.

In FIG. 9, among 16 optical signals spaced at 200 GHz, the wavelength dispersion of the optical signal of the channel with the least wavelength dispersion is the abscissa, and when these signals are propagated along an optical fiber, the ratio (dB) of the four-wave mixing intensity to the signal intensity is shown on the ordinate. It is known that when the ratio of the optical intensity of the four-wave mixing to the optical signal intensity is −30 dB or greater, the optical signal deteriorates, and from FIG. 9, it can be seen that when the optical dispersion of a signal nearest the zero dispersion wavelength is 0.35 ps/km/nm or less, degradation becomes great. As described above, generally because the dispersion slope of an optical fiber is about 0.07 ps/nm²/km, when the wavelength distance from the zero dispersion wavelength of the optical signal whose optical dispersion is nearest the zero dispersion wavelength falls below 5 nm (=0.35/0.07), there is degradation. In other words, if the wavelength distance from the zero dispersion wavelength of the optical signal whose optical dispersion is nearest the zero dispersion wavelength is 5 nm or greater, the problems due to four-wave mixing can be avoided.

In addition, due to variance in manufacturing, presently the zero dispersion wavelength of the dispersion-shifted fibers widely manufactured and installed is generally distributed from 1535 nm to 1565 nm, centered on 1550 nm. Thus, when dispersion-shifted fibers presently manufactured and installed are used as the optical transmission path, the problem of degradation due to four-wave mixing can be avoided by making the wavelength of the signal 1530 nm (1535 nm−5 nm) or less, or 1570 nm (1565 nm+5 nm) or greater.

Next, the reason for setting the range of the wavelength of the optical signal from 1450 nm to 1650 will be explained.

Figure 10:
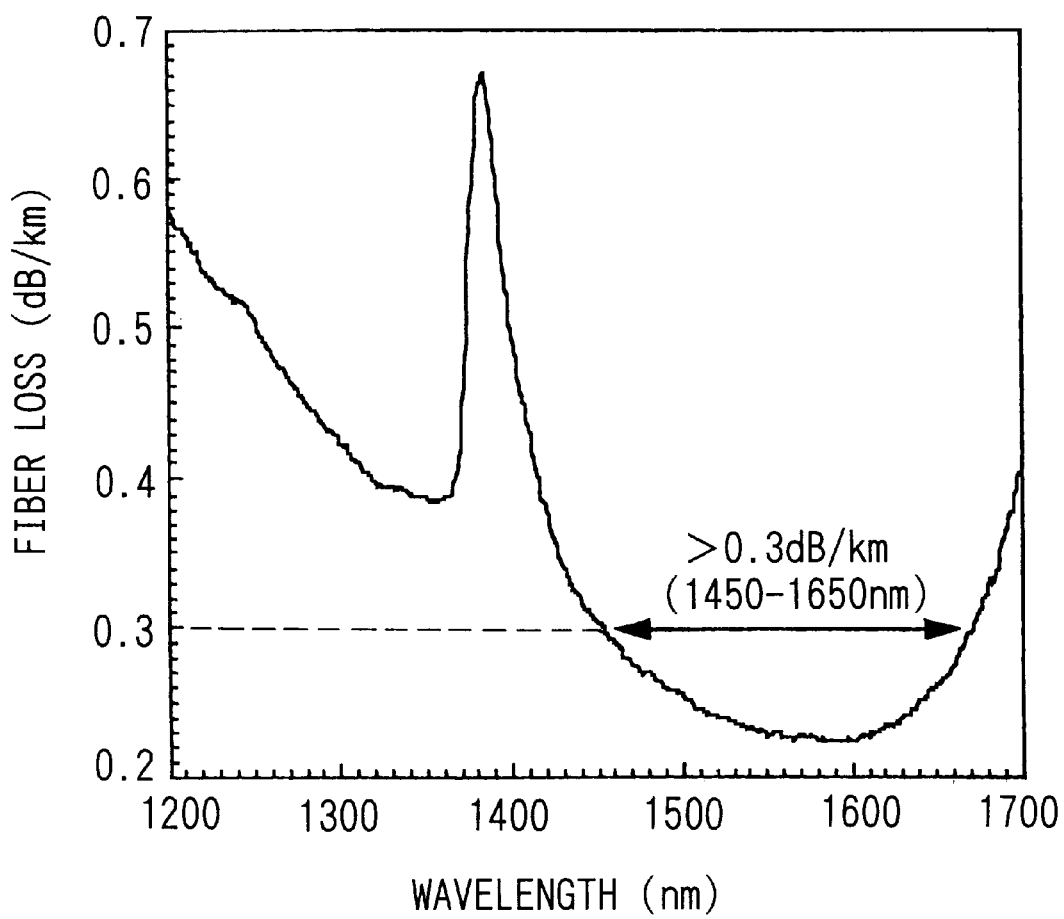
FIG. 10 shows a typical example of the loss in the dispersion-shifted fiber versus wavelength characteristics.

FIG. 10 shows a typical example of the characteristics of the dispersion-shifted fiber loss versus wavelength. When using a dispersion-shifted fiber as the optical transmission path, the span is generally 100 km. In addition, the gain of the optical amplifiers which form the repeaters is generally 30 dB. Here, it can be understood that if the fiber loss is 0.3 dB/km (30/100), a wavelength form 1450 nm to 1650 nm can be used.

Figure 11:
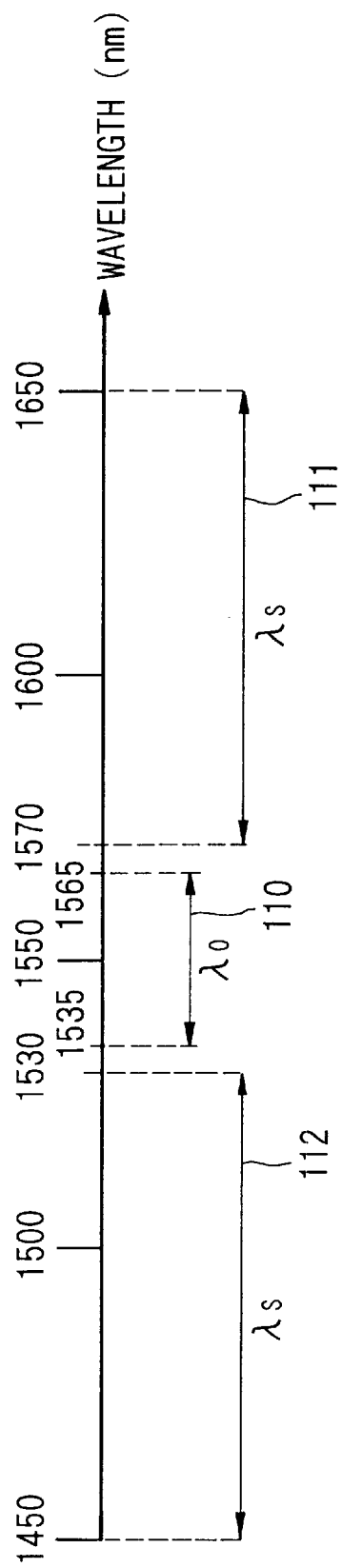
FIG. 11 shows the second wavelength band limit.

From the above, when dispersion-shifted fibers presently manufactured and installed are used as an optical transmission path, if the wavelengths between 1450 nm and 1530 nm shown by reference numeral 112 in FIG. 11, or the wavelength between 1570 nm and 1650 nm shown by reference numeral 111 are used as the wavelength of the optical signal, there is no degradation in transmission loss incurred due to four-wave mixing, and long distance wave multiplexed transmission can be realized. Moreover, reference numeral 110 denotes the zero dispersion wavelength distribution of the dispersion-shifted fiber which is the optical transmission path.

Figure 12:
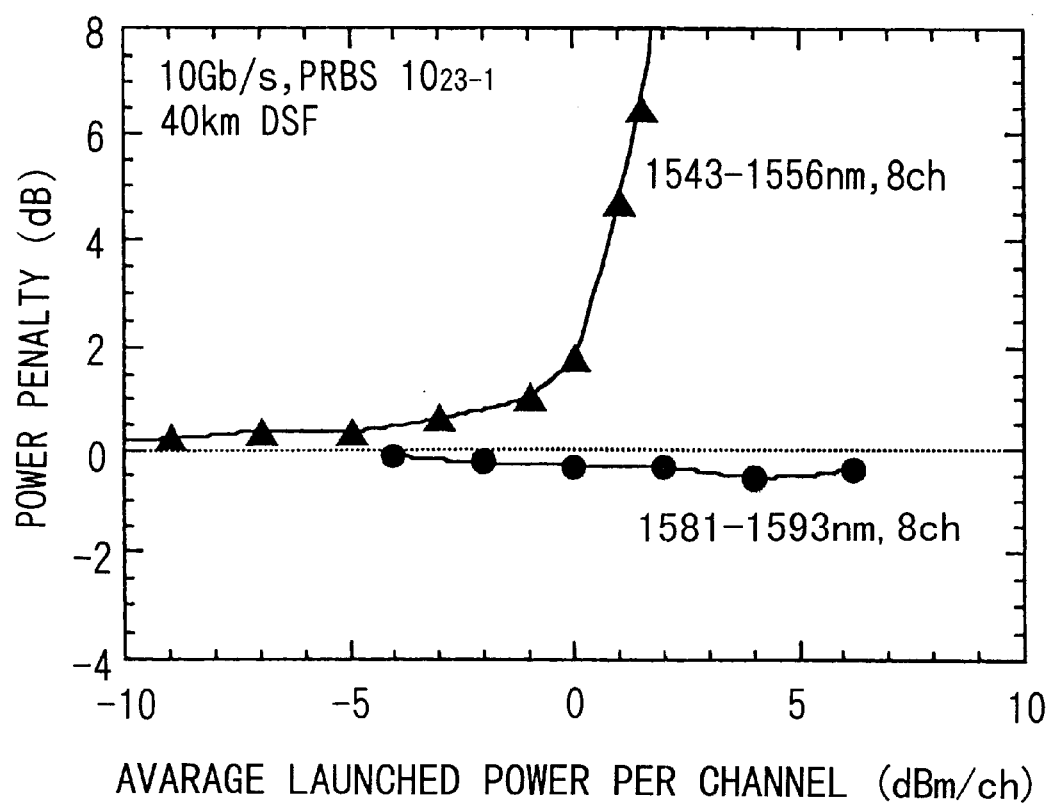
FIG. 12 shows the experimental results for the relation between average transmission power per channel an the power penalty.

Next, the validity of the wavelength bands 111 and 112 of the optical signal shown in FIG. 11 is demonstrated experimentally. FIG. 12 is the experimental results demonstrating the relation between the average transmission intensity for each channel and the power penalty. In the figure, the abscissa is the average transmission output intensity for each channel, and the ordinate is the power penalty due to four-wave mixing. The dispersion-shifted fiber used had a length of 40 km, a transmission optical signal bit rate of 10 Gb/s, 8 different wavelengths, and an optical frequency spacing of 200 GHz. Here, the wavelengths of the optical signals in the experiment were the two conventionally used 1543~1556 nm wavelength band, and the 1581~1589 nm wavelength band according to the present embodiment.

The power penalty used here is defined as follows:

$$\text{power penalty [dB]} = 10 \times \log(Pt/Pb).$$

Here, Pb is the average received optical power necessary to achieve a bit error rate of $10^{-9}$ when the transmitter is connected directly to the receiver and there is no transmission over a dispersion-shifted fiber used as an optical transmission path. In addition, Pt is the average received optical power necessary to achieve a bit error rate of $10^{-9}$ after a 40 km transmission along a dispersion-shifted fiber.

As is clear from this figure, when using the conventionally used 1543~1556 nm as the wavelength of the optical signals, when the transmission intensity per channel is increased, the power penalty due to the influence of four-wave mixing increases.

In contrast, when the 1581~1593 nm wavelength band according to the present embodiment is used, because the influence of four-wave mixing does not become a problem, the power penalty does not increase. In addition, the possibility of increasing the transmission intensity per channel implies the possibility of increasing the input power of the linear repeaters, and because of this, it is possible to decrease the influence of noise of the optical amplifier, and the transmission distance, that is, the span between repeaters, can be lengthened.

Next, implementations of the wavelength band when the wavelength of the signal is either between 1450 nm and 1530 nm or between 1570 nm and 1650 nm is explained.

(First Implementation)

There is an implementation of a wavelength band wherein the wavelength of the optical signal is allotted to the long wavelength area which can avoid the problems caused by four-wave mixing, that is, allotted to the 1570 nm 1650 nm, shown by the reference number 111 in FIG. 11.

In addition, there is an implementation of a wavelength band wherein the wavelength of the optical signal is allotted to the short wavelength area which can avoid the problems caused by four-wave mixing, that is, allotted to the 1450 nm~1530 nm, shown by the reference number 112 in FIG. 11.

Furthermore, it is also possible to use wavelengths between 1450 nm and 1530 nm, and between 1570 nm and 1650 nm as the wavelength of the optical signal. It is possible to increase the transmission capacity of the fiber in this case.

Moreover, in the above implementation, there is no limitation on the propagation direction of the optical signal. Therefore, all the optical signals can propagate in the same direction, or one part of the optical signals can propagate in a different direction from another optical signals.

(Second Implementation)

Figure 13:
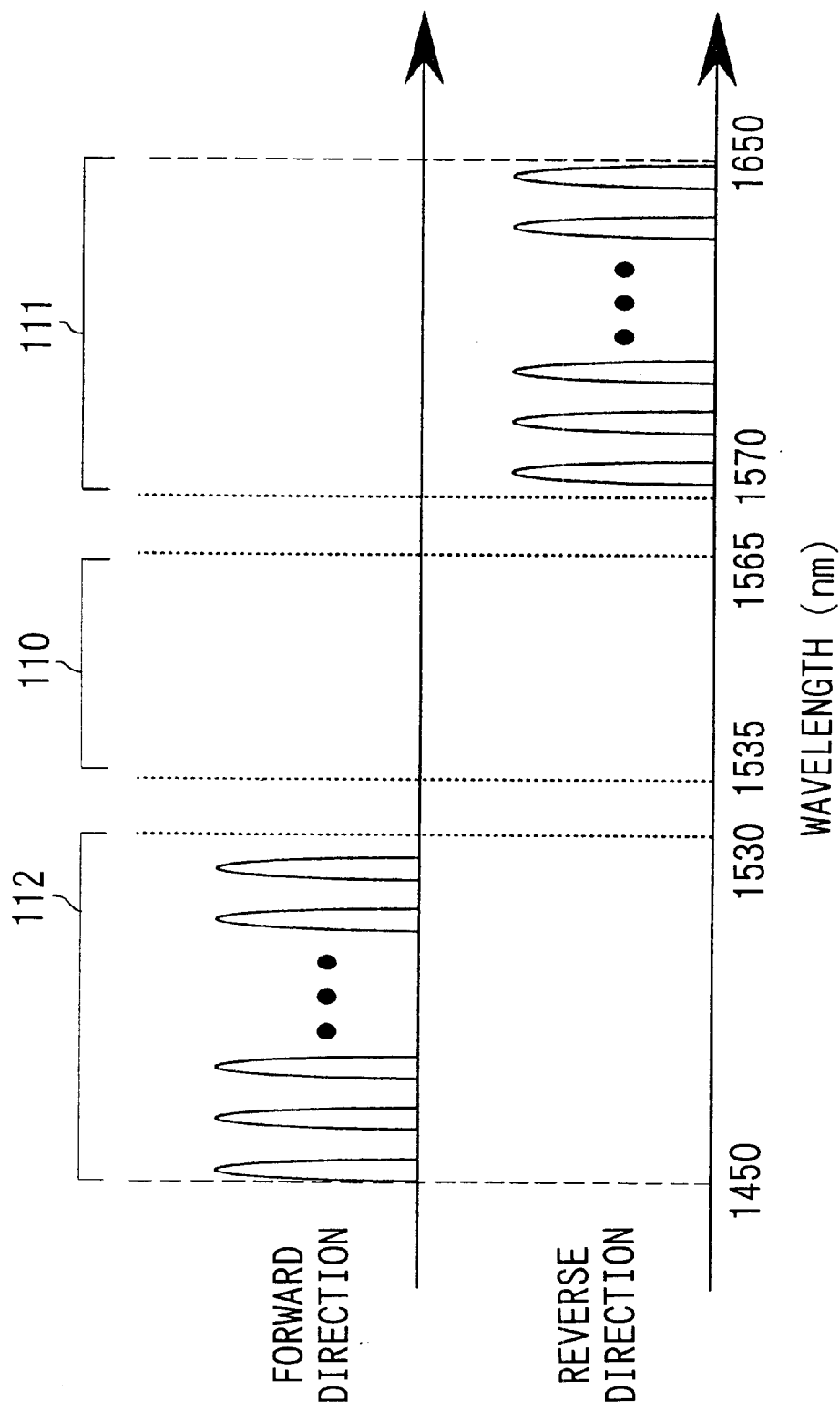
FIG. 13 shows the second implementation in the second wavelength band limit.

In the second implementation, the propagation direction of the optical transmission path of the optical signals whose wavelengths are between 1450 nm and 1530 nm shown by reference numeral 112 in FIG. 13 and the propagation direction of the optical transmission path of the optical signals whose wavelengths are between 1570 nm and 1650 nm shown by reference numeral 111 are opposite directions. Below, the reason for making the form in this manner will be explained.

In the first implementation it was assumed that the wavelengths of the optical signals between 1450 nm and 1530 nm and between 1570 nm and 1650 nm are used simultaneously, and that the propagation directions of all optical signals are the same. In this case, when the bit rate of each wavelength is comparatively small, the walk-off between the optical signals between 1450 nm and 1530 nm and the optical signals between 1570 nm and 1650 nm is of the same order as the time for one time slot. As a result, cross-talk due to stimulated Raman scattering is produced, and the problem of degradation of the transmission quality cannot be ignored. Moreover, "walk-off" means that as a result of a difference in group delay time, the relative time position of two optical signals of differing wavelength become separated depending of the fiber propagation. In addition, "stimulated Raman scattering" is the phenomenon wherein the energy of a short-wave signal is transferred to a long wavelength signal through the vibration of molecules which form the fiber.

Because stimulated Raman scattering is produced only when optical signals in the short-wave part and optical signals in the long-wave part exist together, the decrease in the power of the short-wave signal changes depending on the combination of the signs of both signals and the relative time position, and this causes cross-talk, producing a degradation in the transmission characteristics. In order to avoid this problem, propagating the wavelengths between 1450 nm and 1530 nm and the wavelengths between 1570 nm and 1650 nm in opposite directions is effective. This is because the walk-off of the short-wave signal and the long-wave signal increases, and it is possible to average out the decrease in power of the signal in the short-wave part due to stimulated Raman scattering.

This kind of bi-directional transmission is also useful for avoiding cross-talk due to degenerate four-wave mixing produced between the optical signals between 1450 nm and 1530 nm and the optical signals between 1570 nm and 1650 nm, and waveform degradation due to cross phase modulation. This is because the walk-off due to bi-directional transmission increases, the phase matching conditions for degenerate four-wave mixing are not satisfied, and the cross phase modulation is averaged. Here, cross-phase-modulation is a phenomenon where the phase of an optical signal changes due to a change in the local refraction index caused by other optical signal.

For these reasons, it is preferred that the propagation direction of the optical transmission path of the optical signal between 1450 nm and 1530 nm and the propagation direction of the optical transmission path of the optical signal between 1570 nm and 1650 nm be opposite.

(Third Implementation)

Above, the case wherein the wavelengths of the optical signals are allocated between 1450 nm and 1530 nm, and between 1570 nm and 1650 nm was described. Here, the wavelength band between 1530 nm and 1570 nm is not used in order to avoid signal degradation due to the above-described four-wave mixing. Signal degradation due to four-wave mixing, as described in detail in the above-mentioned reports, can be suppressed by unequal channel spacing of wavelengths arrangement.

Here, in "unequal spacing wavelength arrangement" means the difference between the frequency $f_{FWM}=f_i+f_j+f_k$ of the four-wave mixing, which is generated from the arbitrary three waves of optical frequencies $f_1$, $f_2$, and $f_3$, and either of is $f_1$, $f_2$, and $f_3$ is greater than the receiving bandwidth of the receiver, so they are arranged in such a way that the optical frequency differences between each optical signal have unequally spaced channels. Here, i, j, and k have a value from 1 to 3, and j≠k. For example, the four-wave mixing waves, which three arbitrary waves among 12 wavelength division multiplexed optical signals whose frequency intervals are allotted at 135, 300, 375, 150, 175, 350, 250, 150, 325, and 225 GHz, is generates at wavelength frequency separated by at least by 25 GHz from any signals, and does not become interference noise.

In this context, in an optical signal having a wavelength near the zero dispersion wavelength of the dispersion-shifted fiber which is the optical transmission path, it is possible to expand one part of the useable wavelength range by using an unequal channel spacing frequency allocation.

Figure 14:
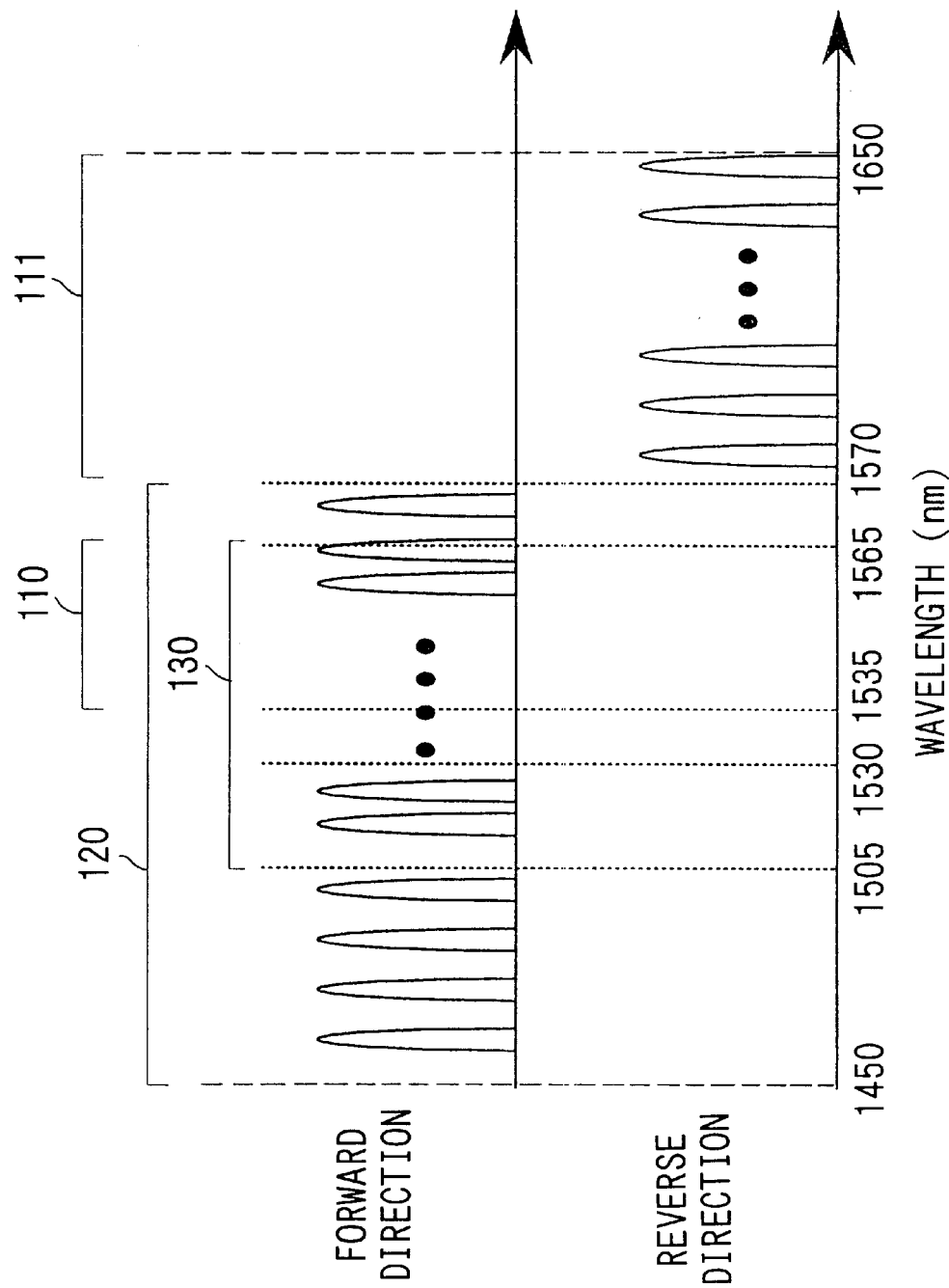
FIG. 14 shows the third implementation in the second wavelength band limit.

One example of this implementation is shown in FIG. 14. The wavelength of wavelength multiplexed optical signals are allocated between 1450 nm and 1570 nm, shown by reference numeral 120, and between 1570 nm and 1650 nm, shown by reference numeral 111. In addition, the optical signals whose wavelengths are allocated between 1450 nm and 1570 nm and the optical signals distributed between 1570 nm and 1650 nm are propagated along the dispersion-shifted fiber propagation path in opposite directions. Even in the worst case in which the fiber's zero dispersion wavelength is 1535 nm, in order to avoid degradation due to four-wave mixing, at least the optical frequency difference between the optical signals above 1505 nm (=1535−(1565−1535)) or greater and 1565 nm or below shown by reference numeral 130 are allocated with unequal spacing.

Moreover, among the optical signals distributed between 1450 nm and 1570 nm shown by reference numeral 120, when the wavelengths of the optical signals among them are near 1570 nm, the optical frequency differences of 1500 nm (=1535−(1570−1535)) or greater and 1570 or less are allocated with unequal spacing.

Figure 15:
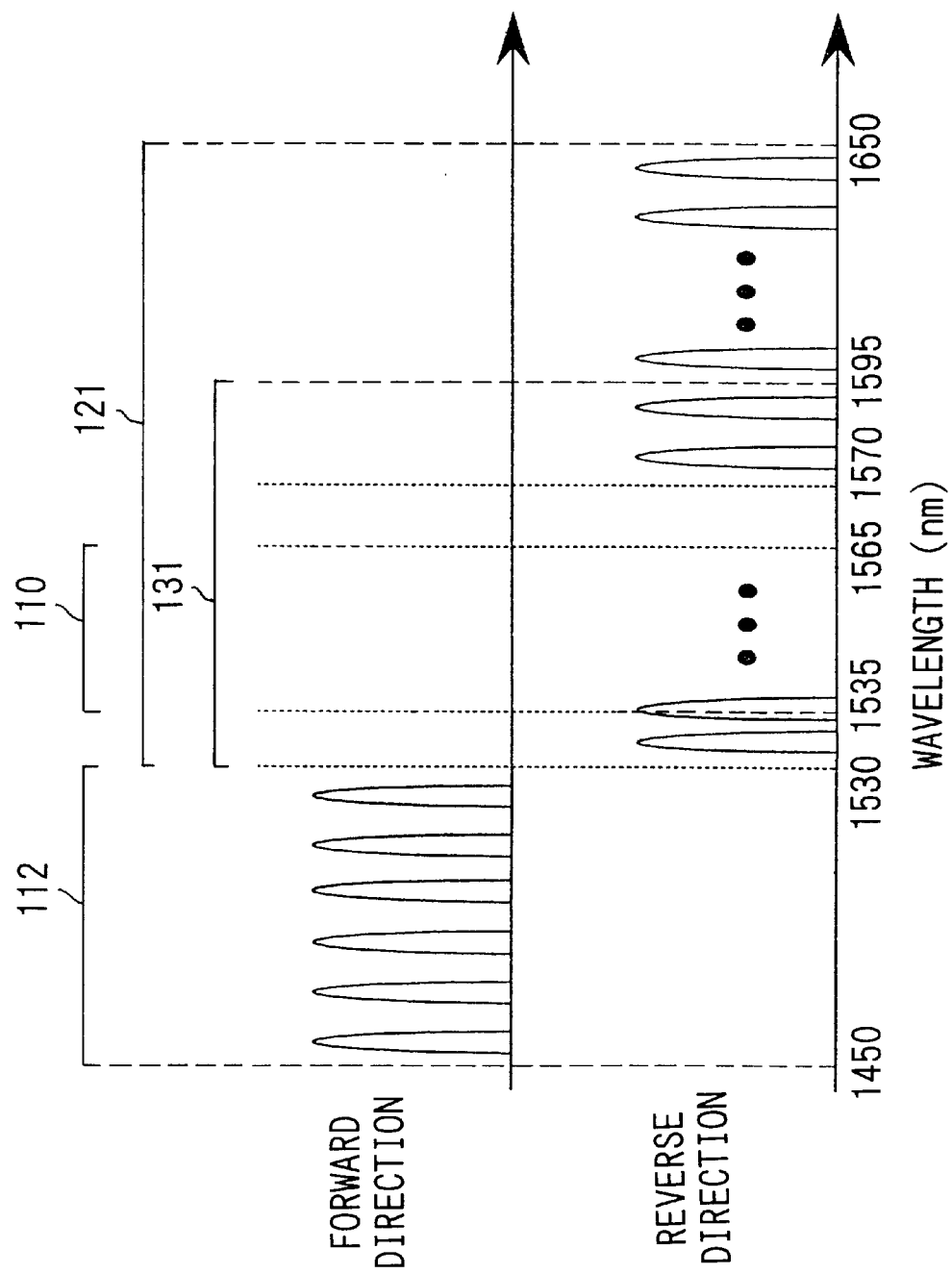
FIG. 15 shows another example in the third implementation in the second wavelength limit.

In this manner, when divided between the 1450 nm and 1530 nm shown by reference numeral 112 and between 1530 nm and 1650 nm shown by reference numeral 121 in FIG. 15, the optical signals whose wavelengths are distributed between 1450 and 1530 nm, and the optical signals whose wavelengths are distributed between 1530 nm and 1650 nm are propagated in the opposite direction along the dispersion-shifted fiber transmission path. In addition, even in the worst case in which the zero dispersion wavelength of the fiber is 1565 nm, in order to avoid degradation due to four-wave mixing, at least the optical frequency difference between the optical signals with wavelengths, shown by reference numeral 131, between 1535 nm or greater and 1595 nm (=1565+(1545–1535)) or less are allocated with unequal spacing.

Moreover, among the optical signals allocated between 1530 nm and 1650 nm, shown by reference numeral 121, when the wavelength of the optical signals among them are close to 1530 m, the optical frequency difference between optical signalss 1530 nm or greater and 1600 nm (=1545+ (545–1530)) or less are distributed with unequal spacing.

Next, examples of a wavelength division multiplexed optical transmission system wherein the wavelength band used in the optical signals explained in the first through third embodiments is limited will be explained with reference to FIGS. 16 to 20.

Figure 16:
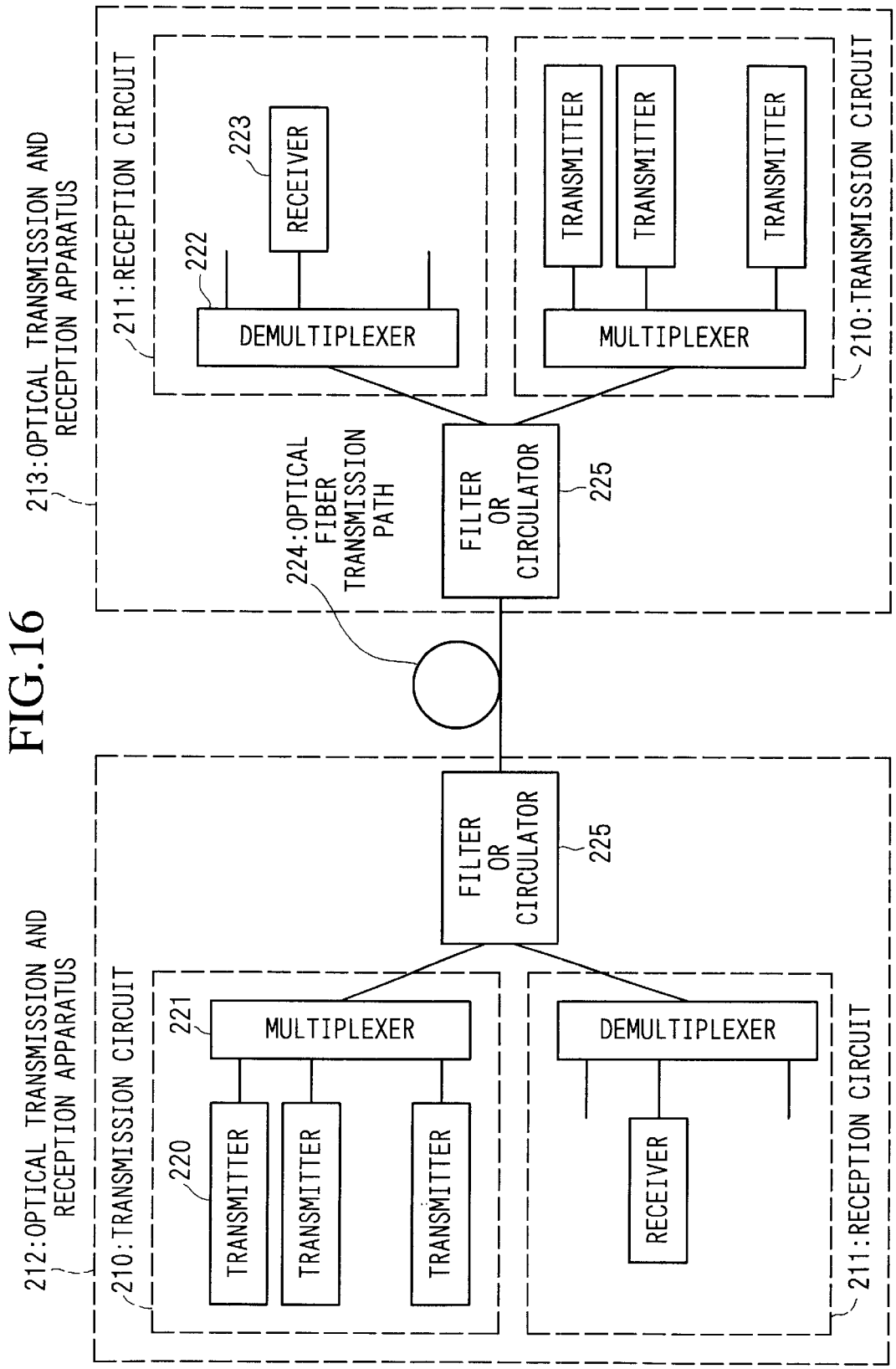
FIG. 16 shows a block diagram of the first wavelength division multiplexed optical transmission system in the second wavelength band limit.

FIG. 16 is a block diagram of the first wavelength division multiplexed optical transmission system. According to FIG. 16, this system comprises optical transmission and reception apparatuses 212 and 213 in turn comprising a transmission circuit 210 and a reception circuit 121, and one optical fiber transmission path 224 connecting the optical transmission and reception apparatuses 212 and 213. The transmission circuit 210 comprises transmitters 220 which generate optical signals of different wavelengths and a multiplexer 221 which wavelength multiplexes optical signals, and the reception circuit 211 comprises a demultiplexer 222 which separates the optical signals, and receivers 223 which demodulate the electrical signal from the demultiplexed optical signals. In addition, the optical transmission and reception apparatuses 212 and 213 comprise the transmission circuit 211 and the reception circuit 212, and a filter or circulator 225. Moreover, the transmitter 220 comprises an optical source 11 which sets the different wavelengths in FIG. 1, and a modulator 12 which modulates the optical transmission wave output from the light source with a data signal, and the receiver 223 comprises the opto-electric converter (O/E) in FIG. 1, and an electrical reception circuit 34 which demodulates the data signal from each electrical signal.

Figure 17:
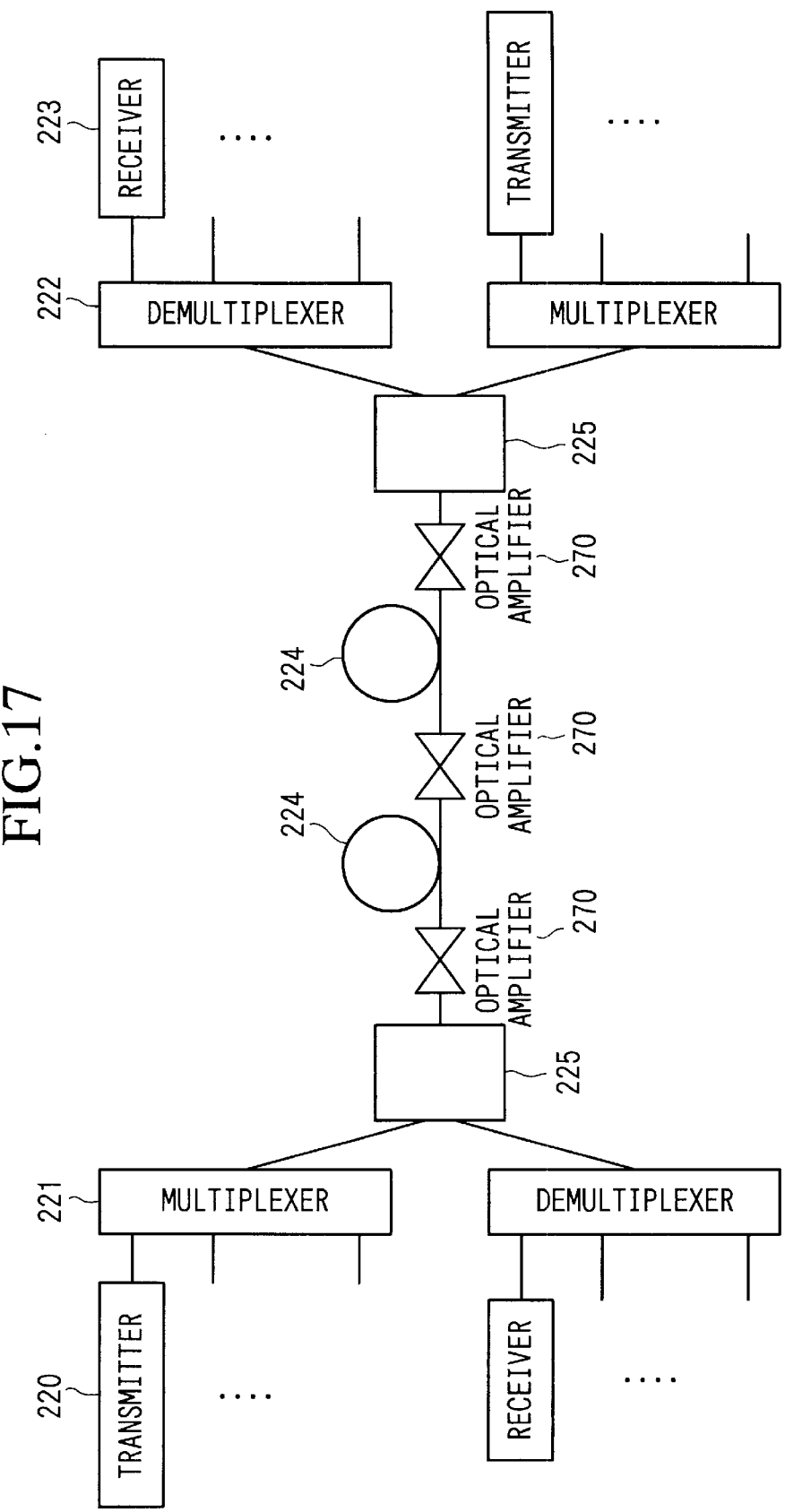
FIG. 17 shows a block diagram of the second wavelength division multiplexed optical transmission system in the second wavelength band limit.

FIG. 17 is a block diagram of the second wavelength division multiplexed optical transmission system. Compared with the system in FIG. 16, this is a point-to-point nonrepeated or multi- repeater optical wavelength division multiplexed bi-directional transmission system characterized in amplifying together all optical signals by at least one bi-directional optical amplifier 270, when transmitted, received, or repeated. Moreover, the parts in FIGS. 17 to 20 which correspond to parts of FIG. 16 have identical reference numerals, and their explanation is omitted.

In this manner, in a system which transmits optical signals on an optical fiber transmission path 224 with high power using a bi-directional optical amplifier 270, the degradation due to four-wave mixing and Raman cross-talk becomes great in the conventional wavelength bands on which optical signals are distributed. However, by using the implementation of wavelengths of optical signals described above, these can be avoided.

Figure 18:
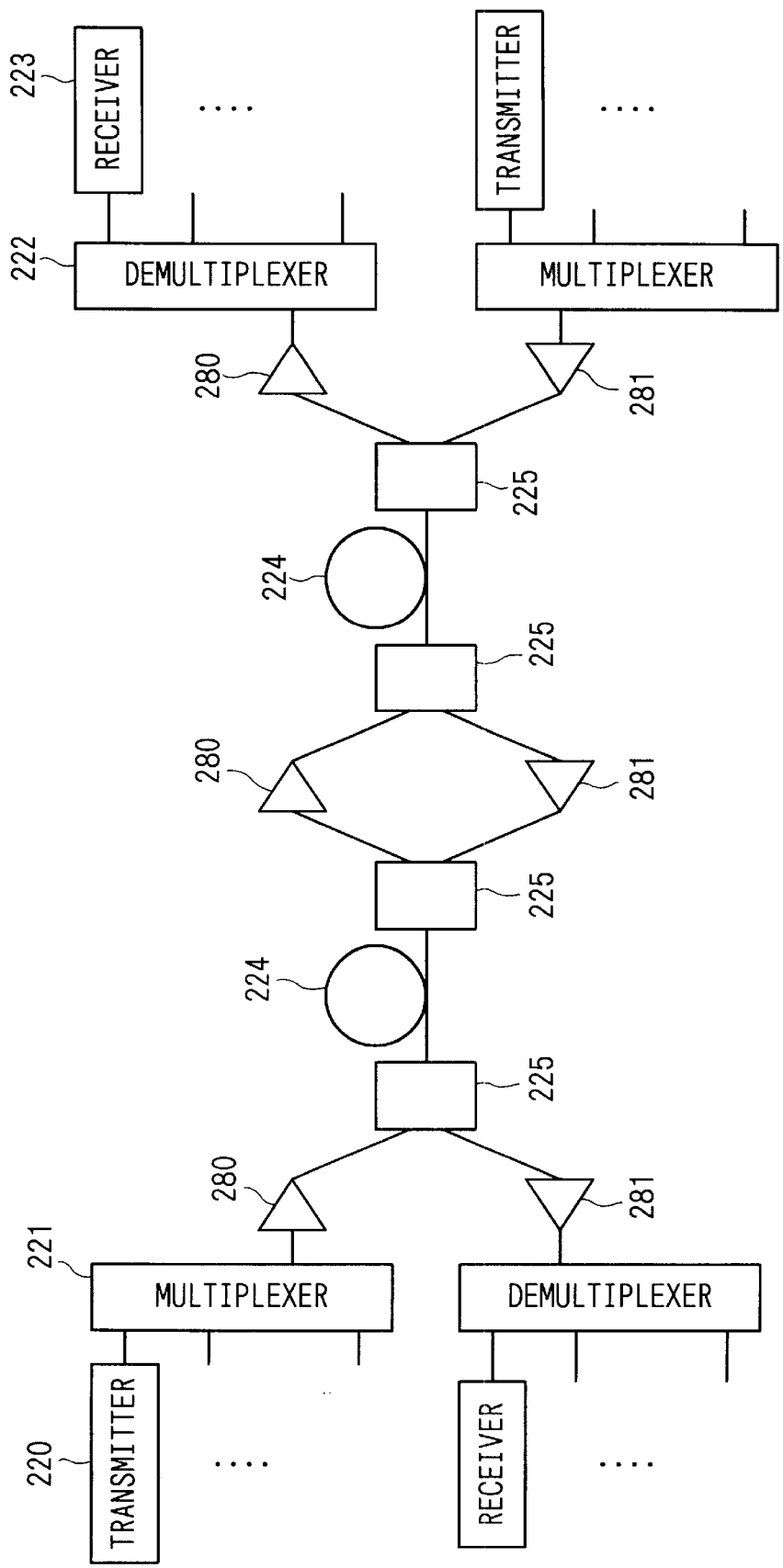
FIG. 18 shows a block diagram of the third wavelength division multiplexed optical transmission system in the second wavelength band limit.

FIG. 18 is a block diagram showing the third wavelength division multiplexed optical transmission system. This system is characterized in the optical signals being amplified by the optical amplifiers 280 and 281 depending on the differences in their propagation directions when separated by the differences in their propagation direction by a filter or circulator 225 when transmitted, received, or repeated.

This system, like the system shown in FIG. 17, transmits an optical signal along an optical fiber transmission path at high power using an optical amplifier, and the effect from the implementation of the wavelengths of the optical signal described above are great.

Figure 19:
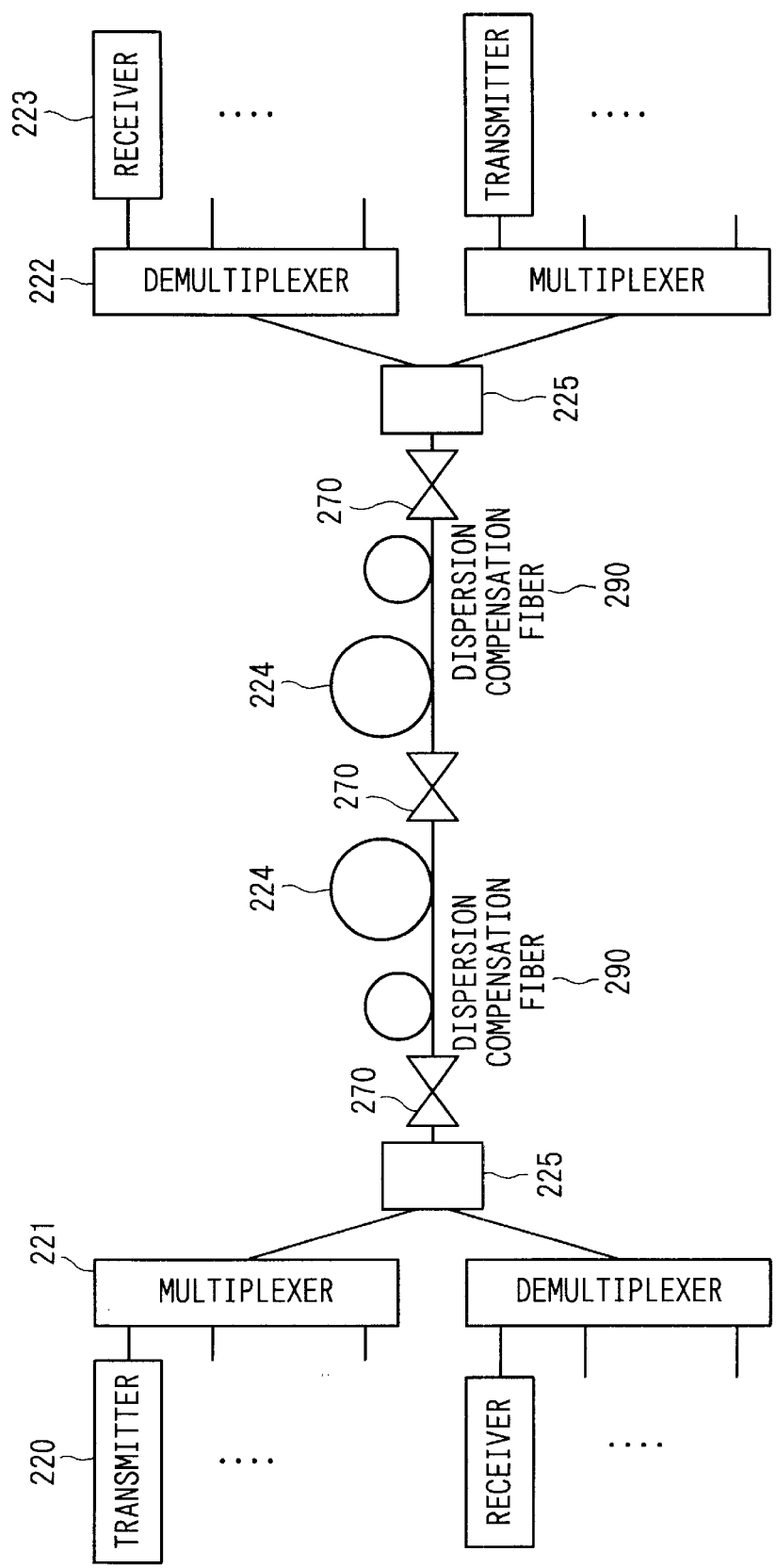
FIG. 19 shows a block diagram of the forth wavelength division multiplexed optical transmission system in the second wavelength band limit.

FIG. 19 is a block diagram showing the fourth wavelength division multiplexed optical transmission system. This system, in comparison with the systems of FIG. 17 and FIG. 18, is characterized in that before or after being propagated along the optical fiber transmission path 224, all optical signals are dispersion compensated together by a dispersion compensating fiber 290 possessing a dispersion slope with the reverse sign of this optical fiber transmission path 224, and whose zero dispersion wavelengths are almost equal.

Figure 20:
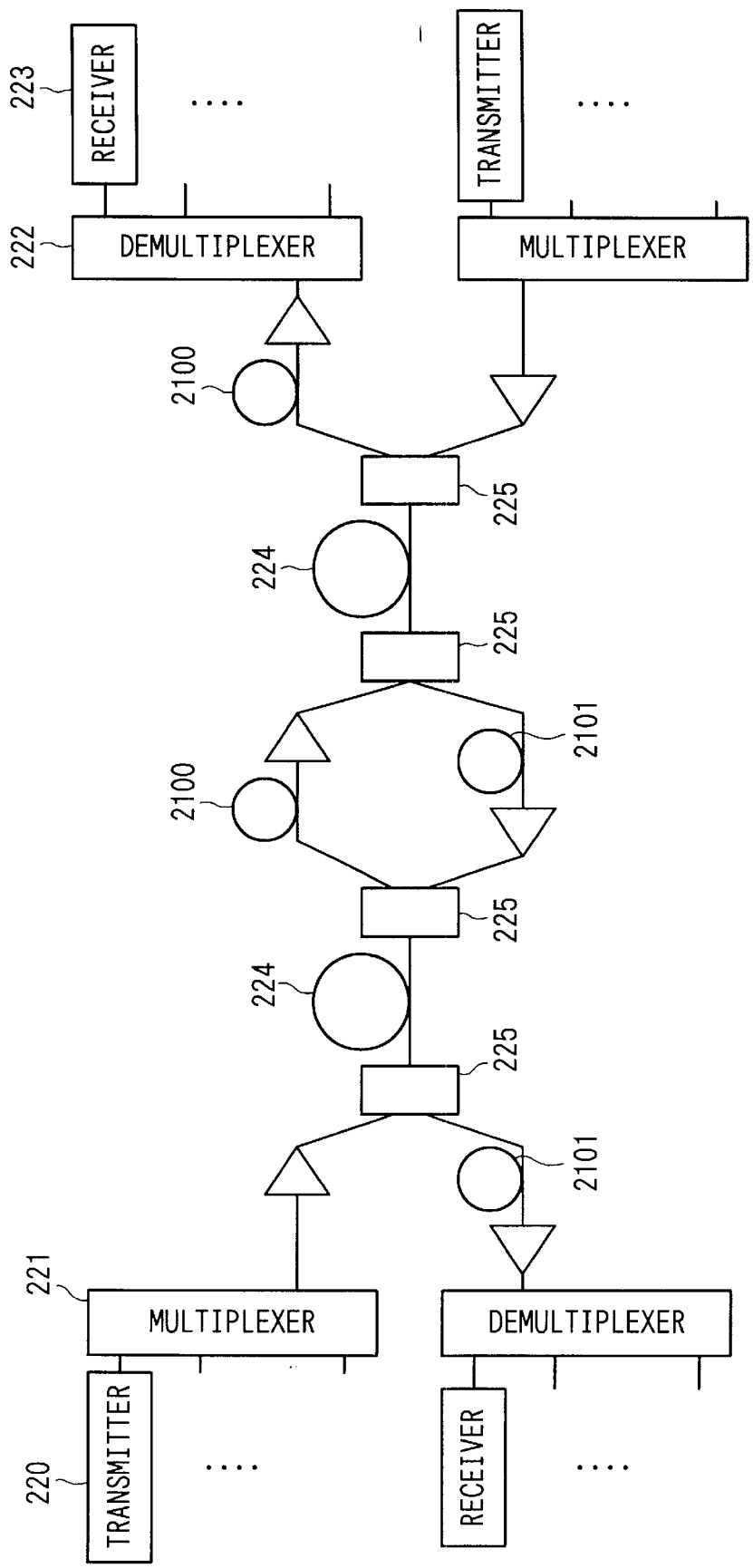
FIG. 20 shows a block diagram of the fifth wavelength division multiplexed optical transmission system in the second wavelength band limit.

FIG. 20 shows a block diagram of the fifth wavelength division multiplexed optical transmission system. This system, in comparison with the systems of FIG. 17 and FIG. 18, optical signals are each dispersion compensated by dispersion compensation fibers 2100 and 2102 which have an average dispersion equal to that of the optical signals in their respective propagation directions, and have a dispersion slope with reverse sign when optical signals are separated depending on their propagation direction by a filter or circulator 225 when transmitted, received, or relayed.

Moreover, in the first implementation of the above-described wavelength band, when the propagation direction of all optical signals is the same, embodiments one through five explained with the first wavelength band limitation are also satisfactory.

In addition, the third implementation in the wavelength distribution of the optical signal described above is not limited to point-to-point transmission, but can be adapted to all network wavelength division multiplexed optical transmission systems.

Moreover, in the present embodiment, because it is assumed that widely fabricated and installed dispersion-shifted fibers are used as an optical transmission path, the above-described implementation three can be used for the wavelength distribution of the optical signal. This technological conception can be applied to an optical transmission path which has characteristics differing from those of the dispersion-shifted fiber described above.

For example, if the zero dispersion wavelength of the dispersion-shifted fiber which is an optical transmission path is, for example, 1550 nm, as shown in FIG. 21, the wavelengths over which the optical signals are distributed can be either between 1450 nm and 1545 nm (1550–5) or between 1555 nm (1550+5) and 1650 nm. That is, depending on the characteristics of the optical transmission path, the wavelength band over with the optical signals are distributed can be decided based on the above-described technological conception.

As described above, by limiting the wavelength band used in multiplexed optical signals, in an already installed dispersion-shifted fiber, it is possible to avoid four-wave mixing. Thus, it is possible to increase the permissible input power to the dispersion-shifted fiber, and greatly extend the possible transmission distance.

What is claimed is:

1. A wavelength division multiplexed optical transmission system comprising a dispersion-shifted fiber whose zero-dispersion wavelength is in the 1550 nm region, wherein:

among wavelength multiplexed optical signals, the wavelengths of either of at least two optical signals are allocated between 1450 nm and 1530 nm, or between 1570 and 1650 nm.

2. A wavelength division multiplexed optical transmission system according to claim 1 wherein:

among said wavelength multiplexed optical signals, the wavelengths of at least two of the optical signals are allocated between 1450 nm and 1530 nm.

3. A wavelength division multiplexed optical transmission system according to claim 1 wherein:

among said plurality of wavelength multiplexed optical signals, the wavelengths of at least two of the optical signals are allocated between 1570 nm and 1650 nm.

4. A wavelength division multiplexed optical transmission system according to claim 1 wherein:

among wavelength multiplexed optical signals, the wavelengths of either of at least two optical signals are allocated between 1450 nm and 1530 nm, and between 1570 and 1650 nm.

5. A wavelength division multiplexed optical transmission system according to claim 4 wherein:

the optical signal whose wavelength is allocated between 1450 nm and 1530 nm and the optical signal whose wavelength is allocated between 1570 nm and 1650 nm propagate along said dispersion-shifted fiber in opposite directions.

6. A wavelength division multiplexed optical transmission system comprising a dispersion-shifted fiber whose zero-dispersion wavelength is in the 1550 nm region, wherein:

the wavelength of multiplexed optical signals are allocated between 1450 nm and 1570 nm, and 1570 nm and 1650 nm, the optical signal whose wavelength is allocated between 1450 nm and 1570 nm, and the optical signal whose wavelength is allocated between 1570 nm and 1650 nm propagate along said dispersion-shifted fiber in opposite directions, and at least the optical wavelength differences of the optical signals whose wavelength is 1505 nm or greater and 1565 or less are unequally spaced.

7. A wavelength division multiplexed optical transmission system comprising a dispersion-shifted fiber whose zero-dispersion wavelength is in the 1550 nm region, wherein:

the wavelengths of said plurality of multiplexed optical signals are allocated between 1450 nm and 1530 nm and between 1530 nm and 1650 nm, the optical signal whose wavelength is allocated between 1450 nm and 1530 nm, and the optical signal whose wavelength is allocated between 1530 nm and 1650 nm propagate along the dispersion-shifted fiber in opposite directions, and at least the optical wavelength differences of the optical signals whose wavelength is 1535 nm or greater and 1595 or less are unequally spaced.

8. A wavelength division multiplexed optical transmission method in which a dispersion-shifted fiber whose zero dispersion wavelength is in the 1550 nm region is a transmission path, wherein:

among wavelength multiplexed optical signals, the wavelengths of either of at least two optical signals are either allocated between 1450 nm and 1530 nm, or between 1570 and 1650 nm.

9. A wavelength division multiplexed optical transmission system comprising a dispersion-shifted fiber whose zero-dispersion wavelength is in the 1550 nm region, wherein at least two wavelength multiplexed optical signals have their wavelength allocated in at least one of first and second wavelength regions, the first and second wavelength regions being between 1450 nm and 1530 nm and between 1570 nm and 1650 nm, respectively.

10. A wavelength division multiplexed optical transmission system comprising a dispersion-shifted fiber whose zero-dispersion wavelength is in the 1550 nm region, wherein:

the wavelengths of multiplexed optical signals are allocated between 1450 nm and 1670 nm and between 1570 nm and 1350 nm;

the optical signals whose wavelength is allocated between 1450 nm and 1570 nm and whose wavelength is allocated between 1570 nm and 1650 nm propagate along said dispersion-shifted fiber in opposite directions; and at least the optical wavelength differences of the optical signals whose wavelength is 1505 nm or greater and 1565 nm or less are unequally spaced.

11. A wavelength division multiplexed optical transmission system comprising a dispersion-shifted fiber whose zero-dispersion wavelength is in the 1550 nm region, wherein;

the wavelengths of multiplexed optical signals are allocated between 1450 nm and 1530 nm and between 1530 nm and 1650 nm;

the optical signals whose wavelength is allocated between 1450 nm and 1530 nm and whose wavelength is allocated between 1530 nm and 1650 nm propagate along the dispersion-shifted fiber in opposite directions; and at least the optical wavelength differences of the optical signals whose wavelength is 1535 nm or greater and 1595 or less are unequally spaced.

* * * * *